(12) United States Patent
Schneider et al.

(10) Patent No.: US 11,838,428 B2
(45) Date of Patent: Dec. 5, 2023

(54) CERTIFICATE-BASED LOCAL UE AUTHENTICATION

(71) Applicant: Nokia Technologies Oy, Espoo (FI)

(72) Inventors: Peter Schneider, Holzkirchen (DE); Ranganathan Mavureddi Dhanasekaran, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/065,914

(22) Filed: Dec. 14, 2022

(65) Prior Publication Data

US 2023/0198780 A1   Jun. 22, 2023

(30) Foreign Application Priority Data

Dec. 20, 2021 (FI) .................................... 20216301

(51) Int. Cl.
*H04L 9/32* (2006.01)
*H04W 12/06* (2021.01)

(52) U.S. Cl.
CPC .......... *H04L 9/3263* (2013.01); *H04W 12/06* (2013.01)

(58) Field of Classification Search
None
See application file for complete search history.

(56) References Cited

U.S. PATENT DOCUMENTS

| 9,699,655 | B1 | 7/2017 | Silis | |
| 2010/0005290 | A1* | 1/2010 | Urien | H04L 9/3263 713/151 |
| 2010/0325427 | A1* | 12/2010 | Ekberg | H04L 9/3247 713/175 |

(Continued)

FOREIGN PATENT DOCUMENTS

| EP | 3713274 A1 | 9/2020 |
| EP | 3422629 B1 | 12/2020 |

(Continued)

OTHER PUBLICATIONS

Extended European Search Report received for corresponding European Patent Application No. 22214341.4, dated Feb. 8, 2023, 6 pages.
"3rd Generation Partnership Project; Technical Specification Group Services and System Aspects; Security architecture and procedures for 5G system (Release 15)", 3GPP TS 33.501, V15.3.1, Dec. 2018, pp. 1-181.

(Continued)

*Primary Examiner* — Brandon Hoffman
(74) *Attorney, Agent, or Firm* — Nokia Technologies Oy

(57) ABSTRACT

According to an example aspect of the present invention, there is provided a method comprising: generating a certificate comprising an identifier of a base station, a public key of the base station, and a public key of a terminal; signing the certificate by a signature based on a private key belonging to the public key of the base station; sending the signed certificate to the terminal using an established security association; monitoring whether the base station receives a request for local authentication of the terminal, wherein the request comprises an encrypted certificate unit and a base station identifier; checking whether the base station identifier is the identifier of the base station and, if it is, decrypting the encrypted certificate unit using the private key; and using the public key of the terminal for a communication with the terminal if the certificate unit comprises the signed certificate.

19 Claims, 7 Drawing Sheets

(56) References Cited

U.S. PATENT DOCUMENTS

| | | | |
|---|---|---|---|
| 2011/0041003 A1* | 2/2011 | Pattar | H04L 41/0681 |
| | | | 714/E11.073 |
| 2017/0289803 A1 | 10/2017 | Silis | |
| 2019/0097793 A1* | 3/2019 | Nix | H04L 63/0272 |
| 2021/0112411 A1 | 4/2021 | Pazhyannur et al. | |

FOREIGN PATENT DOCUMENTS

| | | |
|---|---|---|
| EP | 3902300 A1 | 10/2021 |
| WO | 2020/173863 A1 | 9/2020 |
| WO | 2020/223319 A1 | 11/2020 |

OTHER PUBLICATIONS

"3rd Generation Partnership Project; Technical Specification Group Services and System Aspects; Study on the security aspects of the next generation system (Release 14)", 3GPP TR 33.899, V1.3.0, Aug. 2017, 605 pages.

"3rd Generation Partnership Project; Technical Specification Group Services and System Aspects; Study on authentication enhancements in 5G System; (Release 17)", 3GPP TR 33.846, V0.12.0, Jun. 2021, pp. 1-63.

U.S. Appl. No. 63/252,686, "UE Challenge to a Network Before Authentication Procedure", filed Oct. 6, 2021, pp. 1-34.

Boubakri et al., "Access control in 5G communication networks using simple PKI certificates", 13th International Wireless Communications and Mobile Computing Conference (IWCMC), Jun. 26-30, 2017, pp. 2092-2097.

Abdel-Malek et al., "Enabling Second Factor Authentication for Drones in 5G using Network Slicing", IEEE Globecom Workshops, Dec. 7-11, 2020, 6 pages.

Rescorla, "The Transport Layer Security (TLS) Protocol Version 1.3", RFC 8446, Internet Engineering Task Force (IETF), Aug. 2018, pp. 1-160.

"3rd Generation Partnership Project; Technical Specification Group Radio Access Network; NG-RAN; Architecture description (Release 16)", 3GPP TS 38.401, V16.7.0, Oct. 2021, pp. 1-79.

"3rd Generation Partnership Project; Technical Specification Group Core Network and Terminals; Numbering, addressing and identification; (Release 17)", 3GPP TS 23.003, V17.4.0, Dec. 2021, pp. 1-146.

Office action received for corresponding Finnish Patent Application No. 20216301, dated Jun. 30, 2022, 12 pages.

"3rd Generation Partnership Project; Technical Specification Group Services and System Aspects Study on 5G Security Enhancement against False Base Stations (FBS) (Release 17)", 3GPP TR 33.809, V0.17.0, Nov. 2021, pp. 1-129.

"3rd Generation Partnership Project; Technical Specification Group Services and System Aspects; Study on enhanced security support for Non-Public Networks; (NPN); (Release 17)", 3GPP TR 33.857, V1.0.0, Dec. 2021, 89 pages.

"3rd Generation Partnership Project; Technical Specification Group Services and System Aspects; Security architecture and procedures for 5G system (Release 17)", 3GPP TS 33.501, V17.3.0, Sep. 2021, pp. 1-258.

"Information technology—Open Systems Interconnection—The Directory: Public-key and attribute certificate frameworks", Series X: Data Networks, Open System Communications and Security, ITU-T X.509, Oct. 2019, 236 pages.

\* cited by examiner

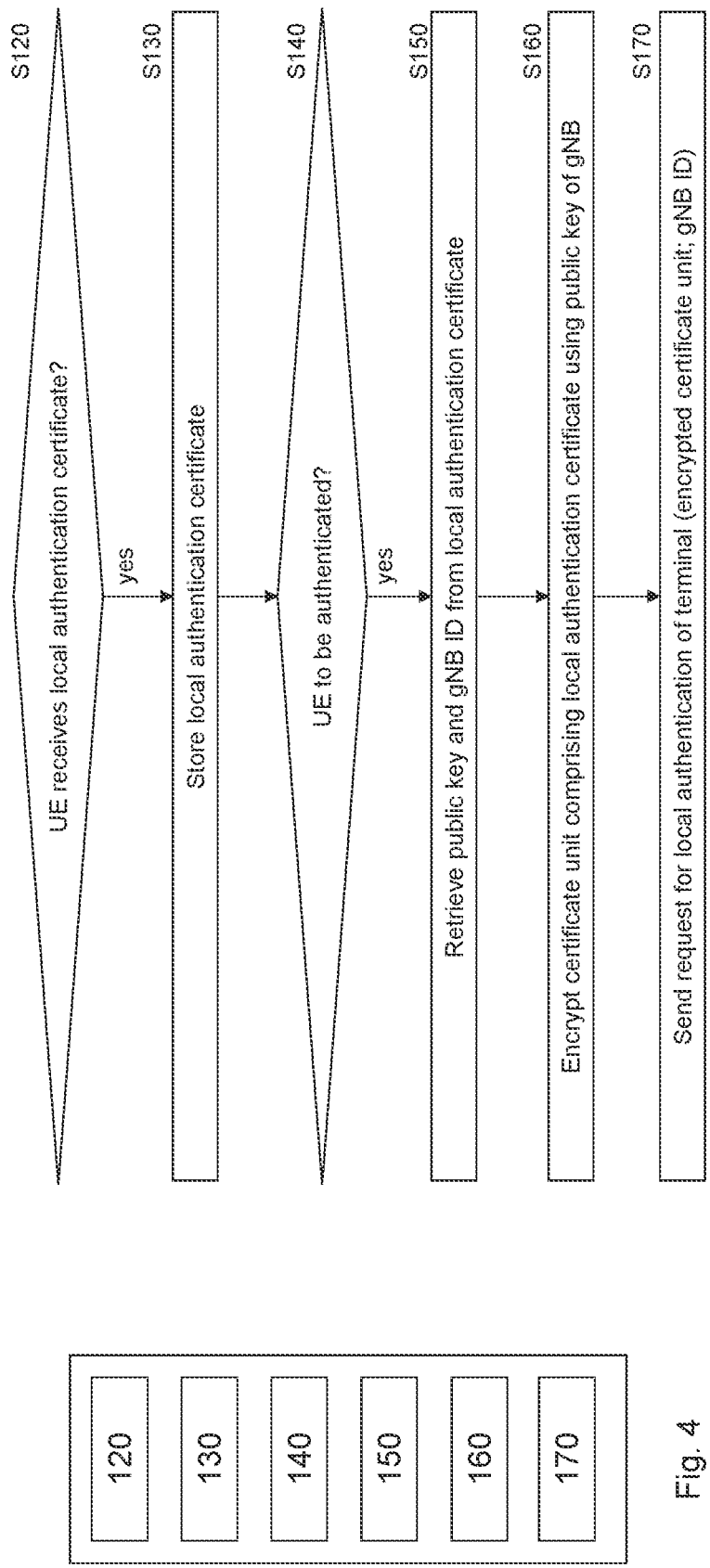

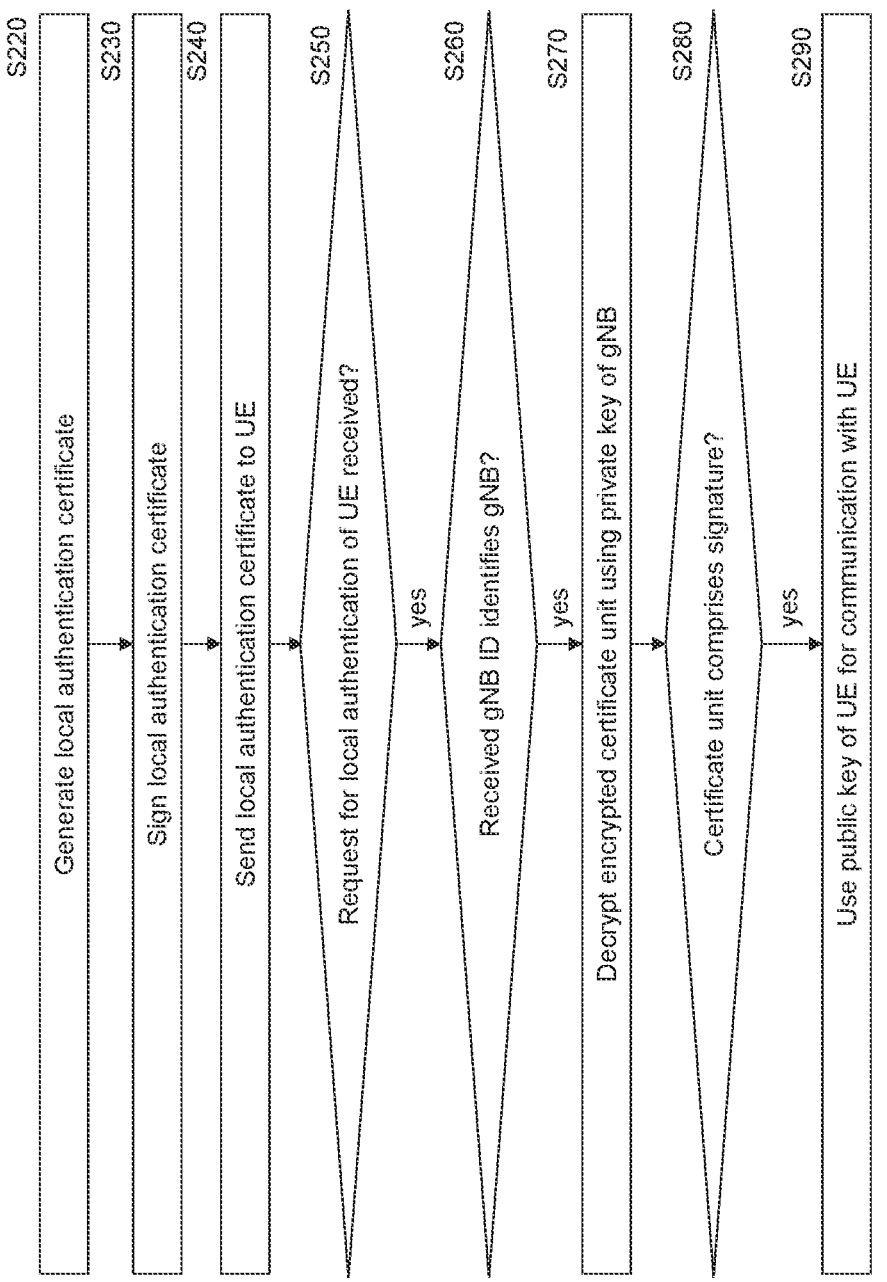
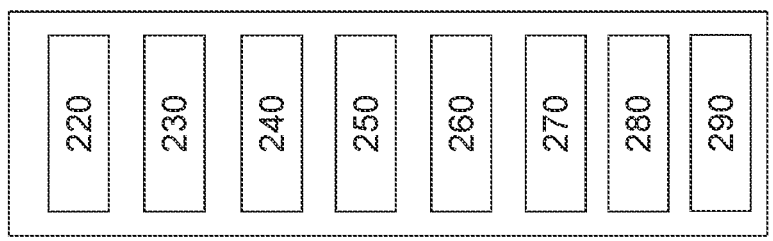

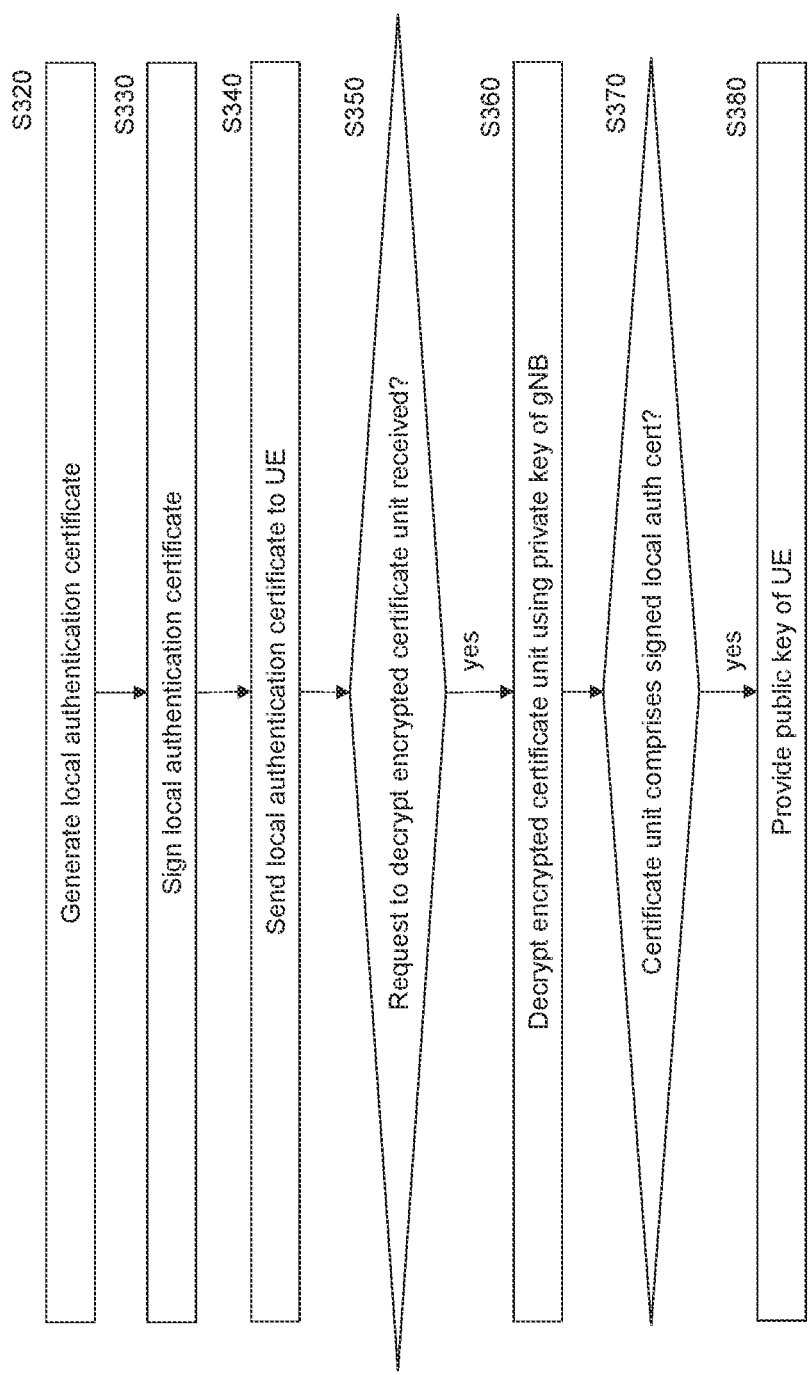

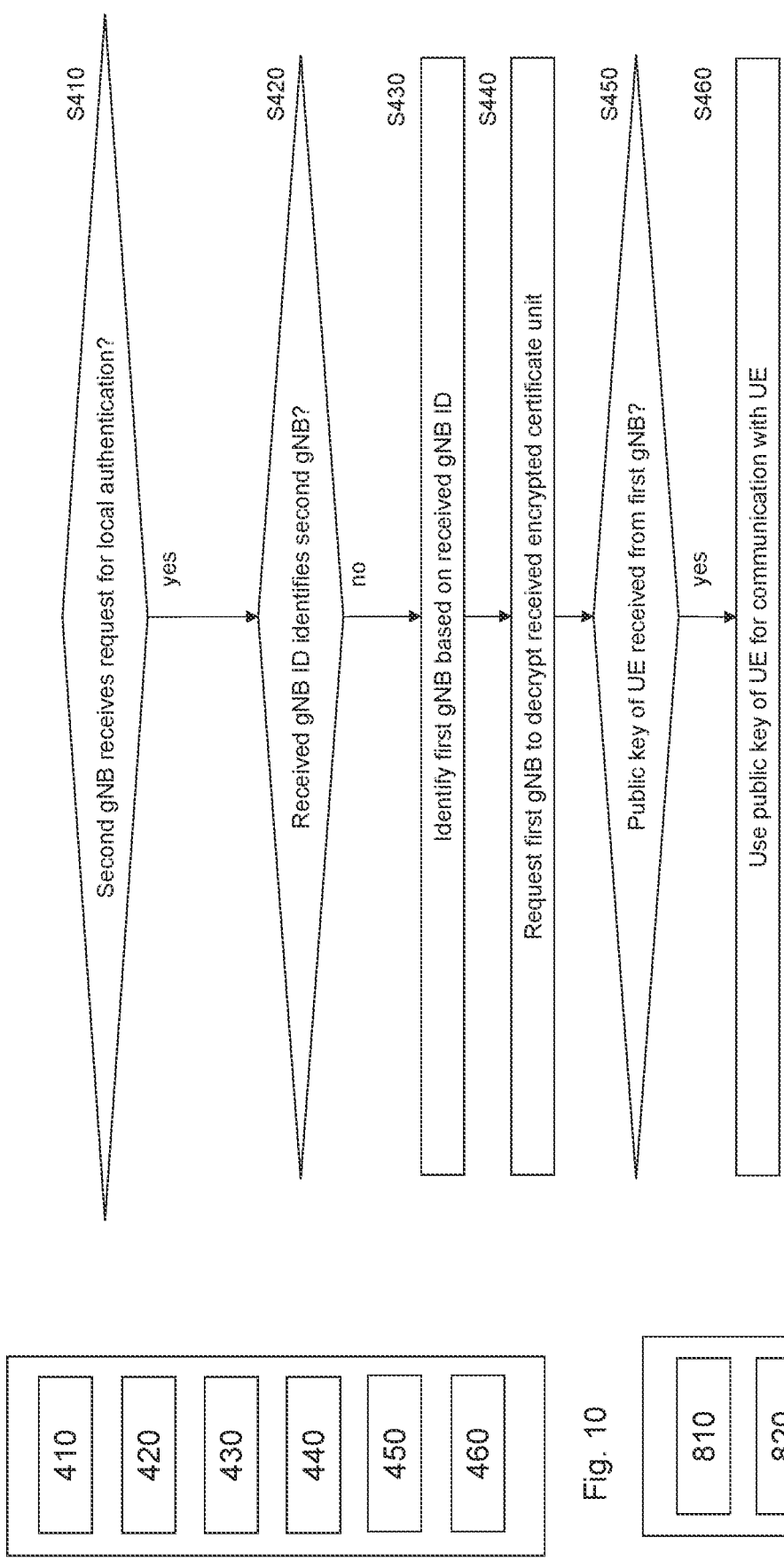

CERTIFICATE-BASED LOCAL UE AUTHENTICATION

FIELD OF THE INVENTION

The present disclosure relates to local UE authentication.

Abbreviations

3GPP 3$^{rd}$ Generation Partnership Project
5G/6G/7G 5$^{th}$/6$^{th}$/7$^{th}$ Generation
AMF Access and Mobility Management Function
ARPF Access Credential Repository and Processing Function
AS Access Stratum
AUSF Authentication Server Function
DH Diffie-Hellman
EAP Extensible Authentication Protocol
EC Elliptic Curve
ECC Elliptic Curve Cryptosystem
ECIES Elliptic Curve Integrated Encryption Scheme
FBS Fake Base Station
gNB 5G base station
HN Home Network
HTTPS Hyper Text Transfer Protocol Secure
ICB Initial Counter Block
ID Identifier
IKE Internet Key Exchange
IP Internet Protocol
IPsec IP secure
KDF Key Derivative Function
LTE Long Term Evolution
MAC Message Authentication Code
ME Mobile Equipment
NAS Non Access Stratum
PDCP Packet Data Convergence Protocol
PDU Protocol Data Unit
RAN Radio Access Network
RRC Radio Resource Control
SIDF Subscription Identifier De-concealing Function
SN Serving Network
SUCI Subscription Concealed Identifier
SUPI Subscription Permanent Identifier
TLS Transport Layer Security
TR Technical Report
TS Technical Specification
UDM Unified Data Management
UE User Equipment
USIM Universal Subscriber Identity Module
WWW World Wide Web

BACKGROUND

Mutual authentication between UE and network in 3GPP is based on a shared long-term key. On the network side, this key is stored at a central location, using the ARPF (Access Credential Repository and Processing Function). The ARPF is accessed via the UDM. Thus, an authentication run always requires connectivity and access to centralized components (UDM, APRF). With 5G, increased Home Network (HN) control has been introduced, meaning that the authentication run always involves the HN. Unlike with LTE, it is no longer possible to pass a bunch of Authentication Vectors from HN to serving network (SN), to allow the SN to carry out additional authentication runs without contacting the HN.

In 3GPP networks, it is up to the network's policy how often the authentication run is carried out. It is good security practice to authenticate a UE on a regular basis, not only when the UE registers with the network, but also when the UE starts a new session or makes a new service request.

Note that former versions of 3GPP TS 33.501 mention in clause 6.13 the term "local authentication", in the context of a procedure that allows UE and gNB to inform each other about the current values of the counters for user plane packets. The term is a misnomer, as there is no authentication involved there. Consequently, the procedure is called "Signalling procedure for PDCP COUNT check" in current versions of 3GPP TS 33.501.

Between UE and network, 3GPP uses authentication based on a shared key. Many other crypto protocols such as TLS or IKE use however public/private key pairs for authentication. Two peers can mutually authenticate when both peers have a private/public key pair, and each peer knows the other peer's public key. Mostly, public keys are exchanged using certificates, where a trusted party asserts the mapping of a public key to an entity by means of a signed certificate.

3GPP UEs do not have private/public keypairs for authentication in public mobile networks nowadays. But in private 5G networks, EAP-TLS may be used as authentication method—then each UE has a private/public key pair, and the network authenticates the UE based on this via the EAP-based authentication procedure involving AUSF/UDM. For public networks, 3GPP will probably stick to the current authentication mechanisms relying on the shared key provisioned on the USIM. An authentication solution that requires that all UEs are provisioned with private/public key pairs would be a major change that is unlikely to be adopted by 3GPP in the near future.

The use of a shared key for authentication between UE and network requires that the UE must tell its identity to the network before a secure connection can be established. Mostly, only a temporary identity is used here, but in some situations, no temporary identity is assigned, and the permanent identity must be sent. Up to 4G, the permanent identity was sent in the clear. In 5G, 3GPP has introduced a mechanism by which a UE can encrypt its permanent identity, called the SUCI Scheme (see 3GPP TS 33.501, Annex C, for further details): Elliptic Curve Integrated Encryption Scheme is used for concealment of the SUPI at UE and de-concealment at SIDF. Elliptic Curve Integrated Encryption Scheme (ECIES) encryption combines ECC based asymmetric cryptography with a symmetric cipher to provide data encryption by the EC private key and data decryption by the corresponding EC public key. All the symmetric keys can be derived in the UE and network independently.

At UE, a key pair (Ephemeral public key and private key) is generated using a key pair generation primitive. Based on the Diffie-Hellman primitive, a shared secret key element is derived from the public key of HN (that is securely provisioned on the UE's USIM) and the generated ephemeral private key. Subsequently, key derivative function KDF is used to generate keying data K consisting of Encryption Key EK, Initial counter block (ICB) and MAC key. With the derived keys EK and ICB, symmetric encryption is performed to encrypt the plaintext block (SUPI) to generate the ciphered text. Moreover, the integrity of the message is protected by adding a Message Authentication Code (MAC). The MAC is a hash value computed from the ciphered text and the MAC key.

At SIDF, the received UE ephemeral public key and private key of home network is used to generate the ephemeral shared key. With the key derivative functions, the same keying data K as used by the UE are generated. The generated EK and ICB is used to de-cipher the cipher text using symmetric decryption. The MAC key is used to generate the expected MAC, which is compared against the received MAC, and with this comparison the integrity of the SUCI is verified.

The mechanism of using a MAC to ensure the integrity of a message is not only used in the SUCI scheme, but is widely applied in many kinds of communication security protocols like TLS or IPsec specified by the IETF, or the NAS and PDCP protocols specified by 3GPP for mobile networks. It should be noted that in such communication protocols, after successfully verifying a received MAC, the receiver not only knows that the message has not been modified by an attacker, but also that this message was created by a party in possession of the MAC key. If the MAC key is only in possession of two communication peers (receiver and sender) but of no one else, receiving a message with a correct MAC implies that the message has been created by the genuine sender, this way implicitly authenticating the sender.

US 2021/0112411 A1 discloses a solution for enabling multi-factor authentication to a private mobile network, wherein a UE connects to a public mobile network using regular centralized authentication, and in response to the public mobile network determining that the UE is not configured for authenticating to the private mobile network, the UE is provisioned with certificate-based access credentials for the private mobile network.

SUMMARY

An objective of the present invention is to improve on the prior art.

According to a first aspect of the invention, there is provided an apparatus comprising means for performing:
checking whether a terminal receives, using an established security association between the terminal and a first base station, from the first base station, a first local authentication certificate, wherein the first local authentication certificate comprises a public key of the terminal, a public key of the first base station, and a base station identifier of the first base station;
storing the first local authentication certificate if the terminal receives the first local authentication certificate;
monitoring whether the terminal is to be authenticated; and
if the terminal is to be authenticated:
retrieving the public key of the first base station and the base station identifier from the first local authentication certificate;
encrypting a certificate unit with the public key of the first base station to create an encrypted certificate unit, wherein the certificate unit comprises the first local authentication certificate; and
sending, to a second base station, a request for local authentication of the terminal, wherein the request for local authentication comprises the encrypted certificate unit and the base station identifier, and the base station identifier is not encrypted in the request for local authentication.

According to a second aspect of the invention, there is provided an apparatus comprising means for performing:
generating a local authentication certificate, wherein the local authentication certificate comprises an identifier of a base station, a public key of the base station, and a public key of a terminal;
signing the local authentication certificate by a signature based on a private key of the base station, wherein the private key of the base station is belonging to the public key of the base station;
sending the signed local authentication certificate to the terminal using an established security association between the base station and the terminal;
monitoring whether the base station receives a request for local authentication of the terminal, wherein the request for local authentication comprises an encrypted certificate unit and a base station identifier;
checking, without decrypting the received base station identifier, whether the received base station identifier is the identifier of the base station if the base station receives the request for local authentication;
decrypting the encrypted certificate unit using the private key of the base station to create a certificate unit if the received base station identifier is the identifier of the base station;
checking whether the certificate unit comprises the local authentication certificate signed by the signature; and
using the public key of the terminal for a communication with the terminal if the certificate unit comprises the local authentication certificate signed by the signature.

According to a third aspect of the invention, there is provided an apparatus comprising means for performing:
generating a local authentication certificate, wherein the local authentication certificate comprises plural information elements including an identifier of a first base station, a public key of the first base station, and a public key of a terminal;
signing the local authentication certificate by a signature based on a private key of the first base station, wherein the private key of the first base station belongs to the public key of the first base station;
sending the signed local authentication certificate to the terminal using an established security association between the first base station and the terminal;
monitoring whether the first base station receives, from a second base station, a request to decrypt an encrypted certificate unit;
decrypting the encrypted certificate unit using the private key of the first base station to create a certificate unit if the first base station receives the request to decrypt the encrypted certificate unit;
checking whether the certificate unit comprises the local authentication certificate signed by the signature; and
providing at least a subset of the information elements comprised by the local authentication certificate in response to the received request if the certificate unit comprises the local authentication certificate signed by the signature, wherein the subset includes the public key of the terminal.

According to a fourth aspect of the invention, there is provided an apparatus comprising means configured to perform:
monitoring whether a second base station receives a request for local authentication of a terminal, wherein the request for local authentication comprises an encrypted certificate unit and a base station identifier;
checking, if the second base station receives the request for local authentication, without decrypting the received base station identifier, whether the received base station identifier is an identifier of the second base station;

identifying a first base station based on the received base station identifier if the received base station identifier is not the identifier of the second base station;

requesting the first base station to decrypt the received encrypted certificate unit and to provide a certificate unit in response;

monitoring whether a public key of the terminal is received from the first base station in response to the requesting; and using the public key of the terminal for a communication with the terminal if the public key of the terminal is received.

According to a fifth aspect of the invention, there is provided a method comprising:

checking whether a terminal receives, using an established security association between the terminal and a first base station, from the first base station, a first local authentication certificate, wherein the first local authentication certificate comprises a public key of the terminal, a public key of the first base station, and a base station identifier of the first base station;

storing the first local authentication certificate if the terminal receives the first local authentication certificate;

monitoring whether the terminal is to be authenticated; and if the terminal is to be authenticated:

retrieving the public key of the first base station and the base station identifier from the first local authentication certificate;

encrypting a certificate unit with the public key of the first base station to create an encrypted certificate unit, wherein the certificate unit comprises the first local authentication certificate; and sending, to a second base station, a request for local authentication of the terminal, wherein the request for local authentication comprises the encrypted certificate unit and the base station identifier, and the base station identifier is not encrypted in the request for local authentication.

According to a sixth aspect of the invention, there is provided a method comprising:

generating a local authentication certificate, wherein the local authentication certificate comprises an identifier of a base station, a public key of the base station, and a public key of a terminal;

signing the local authentication certificate by a signature based on a private key of the base station, wherein the private key of the base station is belonging to the public key of the base station;

sending the signed local authentication certificate to the terminal using an established security association between the base station and the terminal;

monitoring whether the base station receives a request for local authentication of the terminal, wherein the request for local authentication comprises an encrypted certificate unit and a base station identifier;

checking, without decrypting the received base station identifier, whether the received base station identifier is the identifier of the base station if the base station receives the request for local authentication;

decrypting the encrypted certificate unit using the private key of the base station to create a certificate unit if the received base station identifier is the identifier of the base station;

checking whether the certificate unit comprises the local authentication certificate signed by the signature; and using the public key of the terminal for a communication with the terminal if the certificate unit comprises the local authentication certificate signed by the signature.

According to a seventh aspect of the invention, there is provided a method comprising:

generating a local authentication certificate, wherein the local authentication certificate comprises plural information elements including an identifier of a first base station, a public key of the first base station, and a public key of a terminal;

signing the local authentication certificate by a signature based on a private key of the first base station, wherein the private key of the first base station belongs to the public key of the first base station;

sending the signed local authentication certificate to the terminal using an established security association between the first base station and the terminal;

monitoring whether the first base station receives, from a second base station, a request to decrypt an encrypted certificate unit;

decrypting the encrypted certificate unit using the private key of the first base station to create a certificate unit if the first base station receives the request to decrypt the encrypted certificate unit;

checking whether the certificate unit comprises the local authentication certificate signed by the signature; and providing at least a subset of the information elements comprised by the local authentication certificate in response to the received request if the certificate unit comprises the local authentication certificate signed by the signature, wherein the subset includes the public key of the terminal.

According to an eighth aspect of the invention, there is provided a method comprising:

monitoring whether a second base station receives a request for local authentication of a terminal, wherein the request for local authentication comprises an encrypted certificate unit and a base station identifier;

checking, if the second base station receives the request for local authentication, without decrypting the received base station identifier, whether the received base station identifier is an identifier of the second base station;

identifying a first base station based on the received base station identifier if the received base station identifier is not the identifier of the second base station;

requesting the first base station to decrypt the received encrypted certificate unit and to provide a certificate unit in response;

monitoring whether a public key of the terminal is received from the first base station in response to the requesting; and using the public key of the terminal for a communication with the terminal if the public key of the terminal is received.

Each of the methods of the fifth to eighth aspects may be a method of local authentication.

According to a ninth aspect of the invention, there is provided a computer program product comprising a set of instructions which, when executed on an apparatus, is configured to cause the apparatus to carry out the method according to any of the fifth to eighth aspects. The computer program product may be embodied as a computer-readable medium or directly loadable into a computer.

According to some embodiments of the invention, at least one of the following advantages may be achieved:
 local authentication may be provided;
 the bottleneck of centralized authentication is overcome;
 small calculation effort at UE;
 reuse of existing procedures;
 known security attacks are overcome.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the example embodiments of the present invention which is to be taken in conjunction with the appended drawings, wherein:

FIG. 4 shows an apparatus according to an example embodiment of the invention;

FIG. 5 shows a method according to an example embodiment of the invention;

FIG. 6 shows an apparatus according to an example embodiment of the invention;

FIG. 7 shows a method according to an example embodiment of the invention;

FIG. 8 shows an apparatus according to an example embodiment of the invention;

FIG. 9 shows a method according to an example embodiment of the invention;

FIG. 10 shows an apparatus according to an example embodiment of the invention;

FIG. 11 shows a method according to an example embodiment of the invention; and

FIG. 12 shows an apparatus according to an example embodiment of the invention.

DETAILED DESCRIPTION OF CERTAIN EMBODIMENTS

Figure 1:
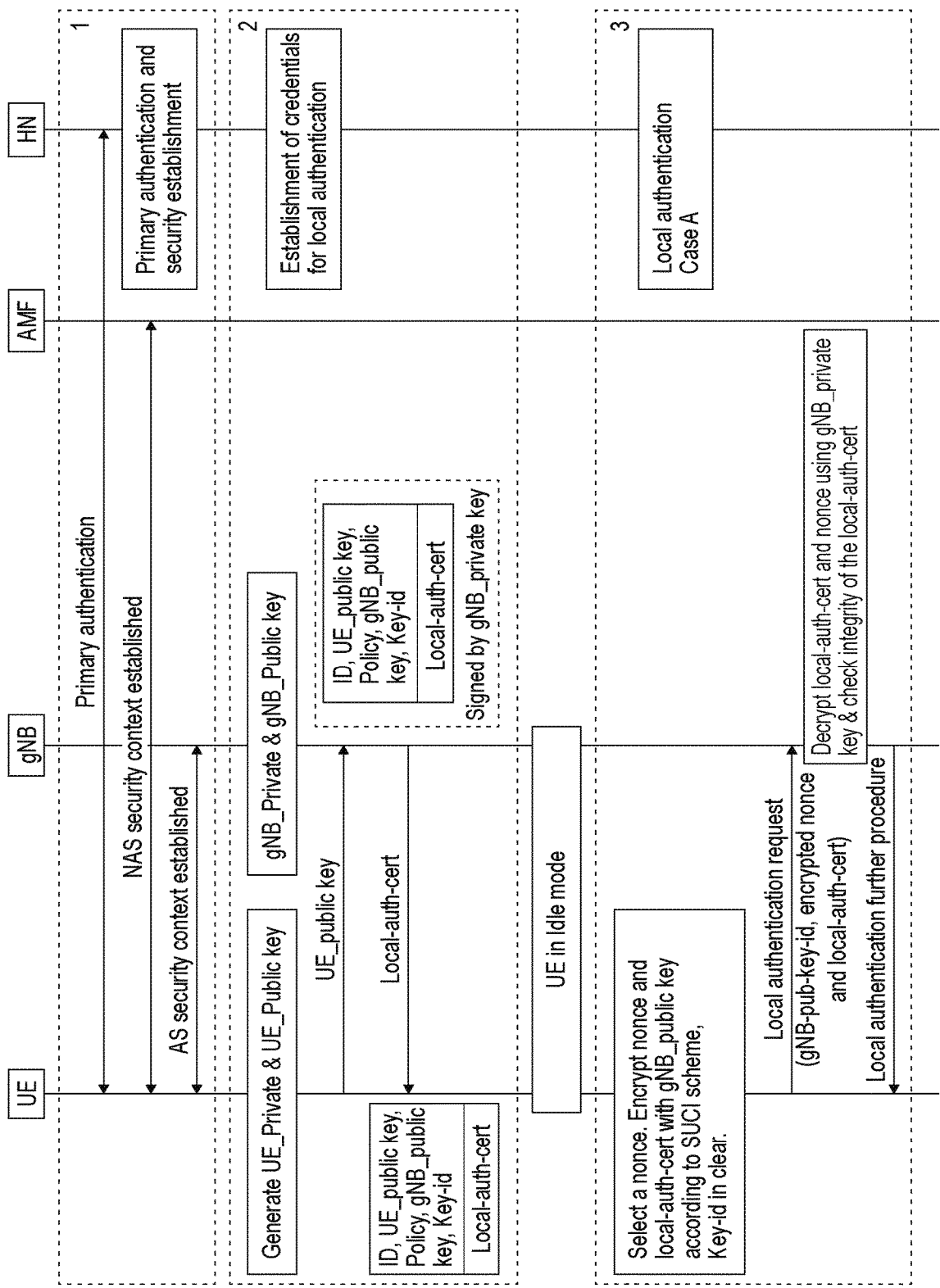
FIG. 1 shows a message flow according to some example embodiments of the invention.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

With ever increasing numbers of connected devices, in particular towards 6G use cases, centralized authentication becomes a bottleneck. Also, centralized authentication may not satisfy the control plane latency requirements of future applications—it may be too slow for certain applications.

According to some example embodiments, after a centralized authentication (i.e. using ARPF) and subsequent establishment of a security context between gNB and UE, UE and gNB establish credentials that can subsequently be used for mutual authentication between UE and gNB (local authentication). For this, the UE creates a private/public key pair and sends the public key to the gNB. The gNB creates a certificate (herein called local authentication certificate, "local-auth-cert", for example), containing a gNB selected UE id (the local-auth-UE-id), the UE's public key, a public key of the gNB, a gNB identifier that identifies the gNB, (optionally) an identifier of the gNB's public key, (optionally) an expiry time, and (optionally) a set of policies (UE-local-access-policies), and a signature created with the gNB's private key. The gNB sends the local-auth-cert to the UE that stores it for subsequent local authentication. The gNB identifier and, if present, the identifier of the gNB's public key may be jointly comprised in a key identifier (herein called "gNB-pub-key-id", for example).

When subsequently a local authentication is needed, the UE sends a specific message (herein called "local authentication request", for example) comprising the local-auth-cert encrypted according to the SUCI scheme, but not based on the HN public key as in the SUCI scheme, but based on the gNB public key contained in the local-auth-cert. Further, the local-auth-request comprises the key-id "gNB-pub-key-id" in the clear (i.e. not encrypted), allowing the RAN to locate the gNB that has created the local-auth-cert. This gNB uses its private key to decrypt the encrypted local-auth-cert. After this step, the RAN knows the UE's public key, so it can authenticate the UE. Vice versa, the UE can authenticate the RAN via the gNBs public key. This authentication may be achieved using state-of-the-art mechanisms, for example those applied in a TLS handshake as specified in IETF RFC 8446.

The local-auth-cert may comprise the following information:

| | |
|---|---|
| Local-auth-UE-id | gNB selected UE id, unique in the scope of one gNB, allows this gNB to identify a UE for which the gNB has issued a local-auth-cert |
| UE public key | Key generated by the UE as part of a private/public key pair, transmitted from the UE to the gNB to be included into the local-auth-cert |
| gNB public key | Key generated by the gNB, can be the same key for multiple local-auth-certs for multiple UEs created by this gNB |
| gNB identifier | Identifies the gNB (may be included in gNB-pub-key-id) |
| Key-id (optional) | Identifies the public key used by the gNB (may be included in gNB-pub-key-id) |
| expiry time (optional) | A time value, after which the local-auth-cert is considered invalid |
| UE-local-access-policies (optional) | Identifies policies for the UE that are relevant in the local scope, e.g. which local services the UE is authorized to use (local services being those that are deployed together with the gNB in an edge cloud) |
| Signature | A digital signature over all other information in the local-auth-cert, computed with the gNB private key belonging to the gNB public key contained in the local-auth-cert |

Examples for the gNB selected UE id (the local-auth-UE-id) are RAN UE NGAP ID; AMF UE NGAP ID; Old NG-RAN node UE XnAP ID; New NG-RAN node UE XnAP ID; M-NG-RAN node UE XnAP ID; S-NG-RAN node UE XnAP ID; gNB-CU UE F1AP ID; gNB-DU UE F1AP ID; gNB-CU-CP UE E1AP ID; gNB-CU-UP UE E1AP ID; ng-eNB-CU UE W1AP ID; ng-eNB-DU UE W1AP ID, as explained in 3GPP TS 38.401, clause 6.2.1.

Examples for the gNB identifier are a Local Area Identification according to 3GPP TS 23.003, clause 4.1, concatenated with a unique number of the gNB within this local area, or the Cell Global Identification according to 3GPP TS 23.003, clause 4.3.1 of one of cells of the gNB.

FIG. 1 shows a message chart according to some example embodiments of the invention.

The message chart comprises 3 major blocks:
1. Primary authentication (i.e. central authentication using ARPF of HN);
2. Establishment of credentials for local authentication; and
3. For a case that the UE requests local authentication at the gNB that created the credentials for local authentication in major block 2, local authentication of the UE by the gNB.

The message flow of FIG. 1 is substantially as follows:

Major Block 1:

A regular centralized (primary) authentication is executed, and the NAS and AS security associations are established. After this step, UE and gNB are implicitly mutually authenticated by providing correct MACs for RRC messages using the key $K_{RRcint}$ derived on both sides, and have a security association.

Major Block 2:

The UE generates a public/private key pair. Generating a public/private key pair is well in the scope of the UE capabilities, as this operation is also required for creating a SUCI. The UE stores the private key securely. A preferred way from the security perspective is to generate the key pair on the USIM, with the private key never leaving the USIM, but this is not mandatory—it can also be done in the ME. The UE passes the public key to the gNB via secure RRC communication.

Upon receipt of the public key of the UE, the gNB creates the local-auth-cert as described above and sends it to the UE via the secure RRC communication.

Then, after major block 2 is performed, the UE may become idle or disconnected and wants to connect again to the network. Hence, the gNB should authenticate the UE again. As another option, the UE should be authenticated again for some other reason such as the "good security practice" described in the prior art section.

Major Block 3

The UE sends a local authentication request message via the secure RRC communication. The local authentication request message includes—
   an encrypted certificate unit. The certificate unit comprises the local-auth-cert received from gNB in major block 2. According to some example embodiments, the local-auth-cert may be concatenated with a random nonce of reasonable length, e.g. 128 bits. The certificate unit comprises the local-auth-cert or the concatenation. The certificate unit is encrypted based on the gNB's public key to create the encrypted certificate unit. UE knows the gNB public key because it can retrieve it from local-auth-cert received from gNB in major block 2. Preferably, the encryption uses the SUCI scheme based on the gNB public key (i.e. the scheme does not use the HN public key, which is used to create a SUCI from a SUPI, but the gNB public key in place of the HN public key); and
   the gNB-pub-key-id (comprising at least the gNB identifier and optionally the key identifier) in the clear (not encrypted).

The gNB receives the local authentication request comprising the encrypted certificate unit. In FIG. 1, it is assumed that the gNB receiving the local authentication request is also the gNB that has created the local-auth-cert contained in the certificate unit.

The gNB sees from the gNB-pub-key-id comprising the gNB ID that it established the credentials for local authentication in major block 2.

If the gNB uses plural public keys and the gNB-pub-key comprises the key ID, the gNB sees from the gNB-pub-key-id which public key of the gNB was used by UE to encrypt the local-auth-cert and (if present) concatenated random nonce of the UE, and uses the respective private key to decrypt it. Then it verifies the integrity of the local-auth-cert by checking the signature in the local-auth-cert. This step ensures that the local-auth-cert has not been tampered with (e.g. the UE itself could otherwise manipulate the UE-local-access-policies). In addition, it may optionally verify the validity of the local-auth-cert by checking the expiry time.

Figure 2:
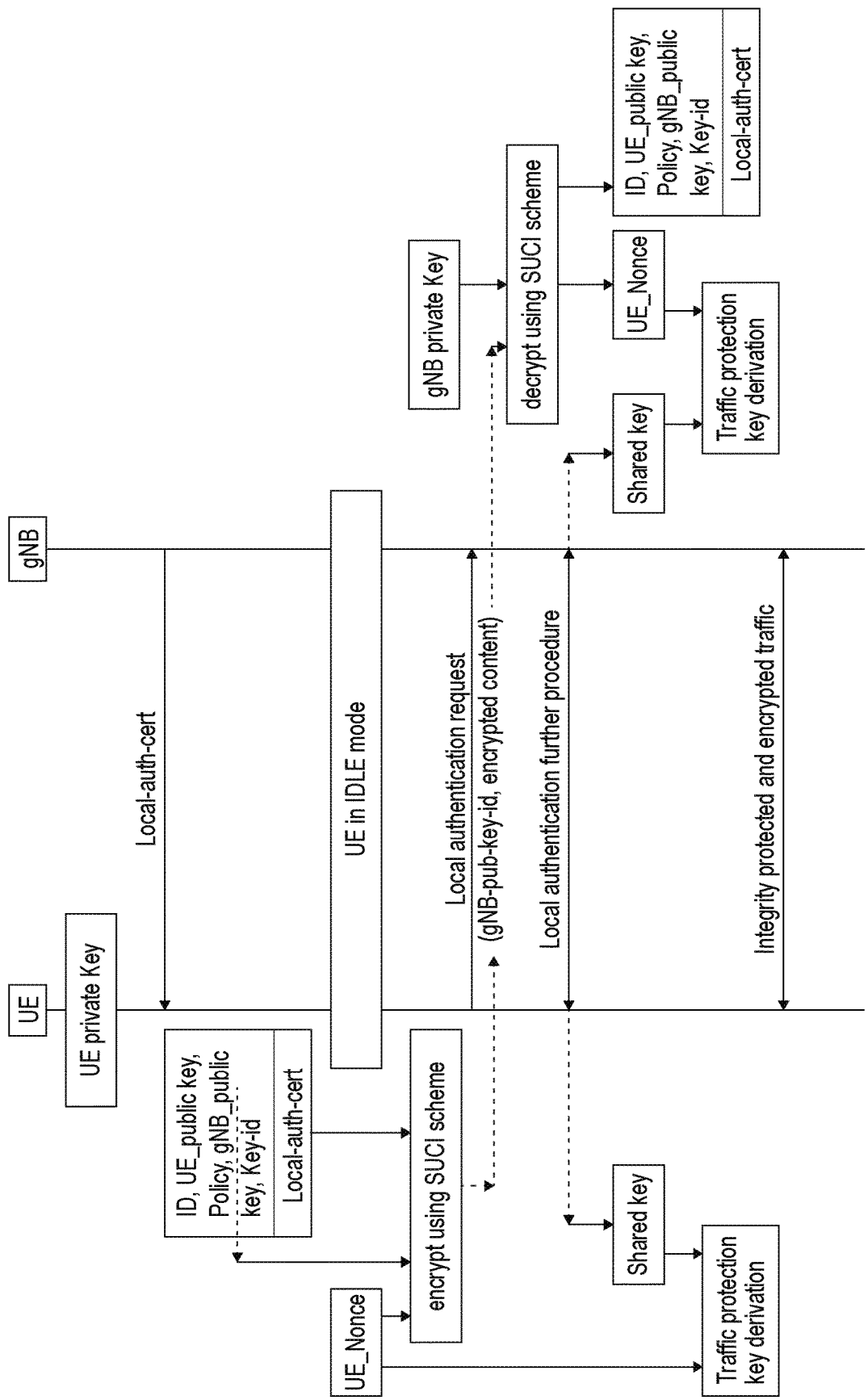
FIG. 2 shows a message flow according to some example embodiments of the invention.

If the verification is successful, the gNB and UE may subsequently use the public keys of the other party for an arbitrary communication with the other party. In particular, the gNB may subsequently authenticate the UE and vice versa. An example of the subsequent authentication procedure is shown in FIG. 2. For example, the gNB may authenticate by requesting a proof of possession of the UE's private key that matches the UE's public key from the local-auth-cert. Vice versa, the gNB can prove possession of the gNB private key simply by proving that it could decrypt the nonce. During this authentication, also a symmetric key may be derived, e.g. via a Diffie-Hellman (DH) key exchange. This key is used like a $K_{gNB}$, to derive traffic encryption and integrity protection keys for the subsequent communication between UE and gNB. For this key derivation, the nonce is used as one of the inputs. When the UE receives subsequently an integrity protected message from the gNB and can successfully verify the message's message authentication code (MAC), it has a proof that the gNB could decrypt the nonce. This way, the gNB is authenticated by the UE.

Optionally, the gNB may authorize the UE to access local services based on the UE-local-access-policies from the local-auth-cert.

Applying the SUCI scheme in the encryption of the local-auth-cert does not only protect sensitive information such as local-auth-UE-id (could otherwise be used to track the subscriber locally) or UE-local-access-policies, but also ensures that this part of the local authentication request is different for each call. Otherwise, the UE could be tracked in the sense that an attacker would know whether two different local authentication request were sent by the same UE or not.

According to some example embodiments of the invention, the nonce is used here not only to authenticate the gNB, but also to prevent a linkage attack via exchanging a current local authentication request of a UE with an old authentication request of a known victim UE. This is the same attack that can be applied against a regular SUCI, the well known linkage attack by SUCI replay, which's mitigation is one of the Key Issues in 3GPP TR 33.846. The mechanism with the nonce prevents this attack, because, if a current local authentication request message is exchanged by an old one, this results in different nonce values on UE and gNB side, and the local authentication will always fail, and no "linkage information" can be obtained by the attacker.

It is an advantage of some example embodiments of the invention that known algorithms are used. For example, one may apply the algorithm used in a TLS handshake between a server with a private/public key pair and a client with no such key pair (as is the case for all the HTTPS traffic in the regular WWW), that only authenticates one side (the server) and establishes a shared key. Applied to the present case, this mechanism allows the gNB to authenticate the UE and to establish a shared key. In addition to that, some example embodiments of the invention use the nonce mechanism to enable the UE to authenticate the gNB.

In some example embodiments, instead of or in addition to a nonce (which may be created by collecting some randomness, e.g. from the radio environment, or by a random number generator), the UE may concatenate a sequence number and/or a time stamp with the local authentication certificate. I.e., in such example embodiments, the sequence number and/or the time stamp may be used in the same way as the nonce.

Concatenating the local authentication certificate and a nonce (and/or a sequence number and/or a time stamp) is an example of combining these information elements. As another example, the respective bits may be interleaved according to a scheme known to both the UE and the gNB.

Figure 3:
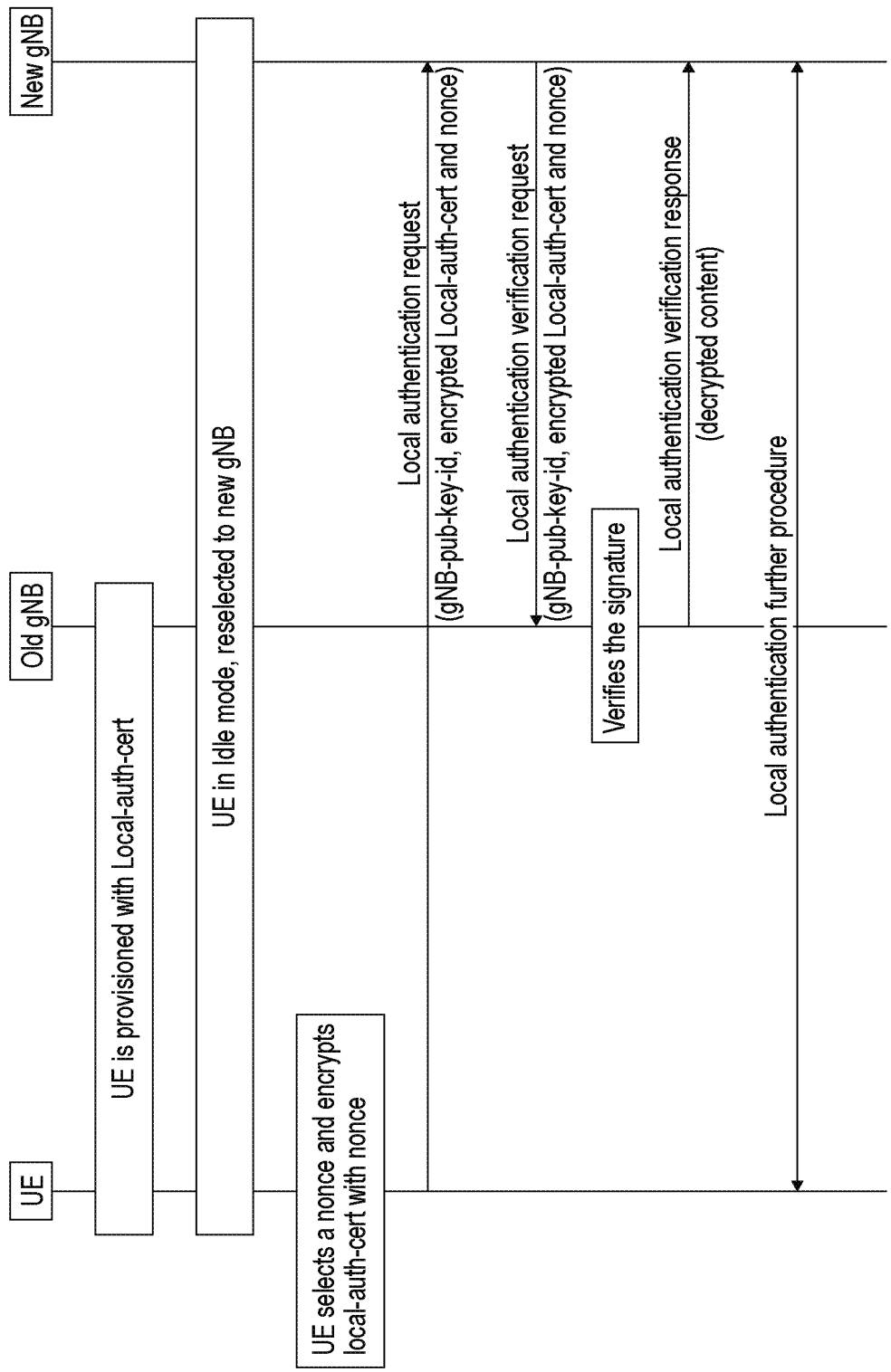
FIG. 3 shows a message flow according to some example embodiments of the invention.

FIG. 3 shows a message flow for a case that the local authentication request is received by another gNB (the "new gNB" or "second gNB") than the gNB ("old gNB" or "first gNB") that generated the local authentication certificate. For simplicity, in FIG. 3, major block 1 of FIG. 1 is not shown, and among the actions of major block 2 of FIG. 1, only the message that the old gNB provides local-auth-cert to UE is shown. Then, the new gNB may authenticate UE, e.g. because UE was in idle mode and wants to reconnect to the new gNB.

Same as shown in FIG. 1, UE may optionally select a nonce and encrypts the received local-auth-cert with the concatenated nonce (if present) to obtain the encrypted certificate unit. For the encryption, UE uses the public key retrieved from the received local-auth-cert, i.e. the public key of the old gNB. Then it sends the local authentication request comprising the encrypted certificate unit to the new gNB.

The new gNB sees from the gNB-pub-key-id (i.e. from the gNB ID) which gNB ("old gNB") created the local-auth-cert. Note that gNB-pub-key-id is not encrypted in the local authentication request.

When the new gNB can contact the old gNB (e.g. the old gNB is in the same area) using a security association (e.g. Xn secured by IPsec), the new gNB forwards the received encrypted certificate unit (i.e. local-auth-cert and nonce) to the old gNB for decryption. The old gNB decrypts the encrypted certificate unit and checks the integrity of the certificate by checking the signature. If this is successful, it returns at least a subset of the information elements comprised by the decrypted local-auth-cert and the nonce (if present in the certificate unit). The subset of the information elements includes at least the public key of the terminal. The old gNB may return the entire decrypted local-auth-cert (comprising all the information elements) and the nonce (if present in the certificate unit) to the new gNB.

The new gNB has now the information required to perform authentication and key agreement like in the case where the new gNB is the same as the old gNB shown in FIG. 1. (The UE may recognize that the new gNB is different from the old gNB, but when the new gNB can prove possession of the nonce, this means that the new gNB has received it from the old gNB and is therefore in a trust relationship with the old gNB, i.e. it is part of the same RAN and can be trusted by the UE.)

As in the case of FIG. 1, if needed, the gNB may authorize the UE to access local services based on the UE-local-access-policies from the local-auth-cert.

Either or both of the old gNB and the new gNb may check the expiry time, if available in the local authentication certificate. If the expiry time has passed and it is checked by the old gNB, it does not provide the certificate unit to the new gNB, or it may provide the certificate unit to the new gNB, possibly with an indication that the validity of the certificate unit has expired. If the expiry time has passed and it is checked by the new gNB, it considers the information contained in the certificate unit as invalid and does not use it.

If the new gNB cannot reach the old gNB using a security association, local authentication is not possible and the network falls back to centralized authentication.

Some further aspects according to some example embodiments of the invention are listed:

Lifetime of certificates: The choice of the lifetime is ruled by policies on the network side. It may depend on the capabilities of the UE, e.g. it could be longer if the UE can use secure hardware to generate and store the private key, and shorter, if this is not the case.

When the UE was successfully authenticated using local authentication, the network may decide to provide a new certificate and optionally advise the UE to discard the old one.

After a local authentication with no involvement of the core network, the UE is obviously not yet reachable for incoming requests via the core network but can use local services.

When the UE connects to the gNB using local authentication, the local authentication certificate comprises an identifier of the UE, and there is still a NAS session maintained, the UE can resume the previous NAS session and any PDU sessions that still exist (in the user plane, if the gNB has changed, the path must be switched to the new gNB). The AMF may decide to trigger a regular, centralized re-authentication at any time. Some sessions may be resumed automatically without any further indication of the UE. As another option the UE indicates whether it would like a session to be resumed. The UE may also specify which of the previously suspended sessions to resume.

A UE may support maintaining more than one local authentication certificate in parallel. It may then select one of the local authentication certificate. For example, it may select the last stored local authentication certificate if not otherwise instructed. In some example embodiments, the UE may store some applicability indication along with each stored local authentication certificate. For example, the applicability indication may be related to the UE's geolocation. The UE may associate each certificate with the geolocation where this certificate was received, and when trying to connect to the network using local authentication, it may select the certificate which associated geolocation matches best the current geolocation. As another option, the applicability indication may be related to system information broadcast by the present gNB. A UE holding more than one local-auth-cert may also use information broadcast by gNBs to find out which of the local-auth-certs is suitable for local authentication at the present gNB. The applicability indication may be related to a combination of the UE's geolocation and system information.

The capability of the UE to hold more than one local-auth-cert in parallel supports the use case that a subscriber with a smartphone often uses one of a small set of gNBs, e.g. when at home or when at office, so most of the authentication runs of this subscriber can be local authentications.

Local authentication is not restricted to the home network, but can also be applied when the UE is roaming in a foreign visited network.

Instead of the UE generating the private/public key pair, the gNB could create this key pair and pass the private key together with the local-auth-cert to the UE. This variant may be used to keep the computation effort on the UE at a minimum.

Some example embodiments of the invention solve the problem of scalability and speed of the centralized authentication mechanism by providing decentralized, fast local authentication. By allowing local authorization of the UE access to local services, the load on the core network can be reduced even more, and operation can be continued even if an edge cloud gets isolated from the core network. Naturally, offloading the core network means putting more load on the RAN. For example, by the use of edge clouds, the required processing resources in the RAN can be provided in an efficient, scalable way. On the UE side, the additionally required capabilities are insignificant, and the computational effort is well in the range of what is required for traditional authentication.

FIG. 4 shows an apparatus according to an example embodiment of the invention. The apparatus may be a terminal, such as a UE or an MTC device, or an element thereof. FIG. 5 shows a method according to an example embodiment of the invention. The apparatus according to FIG. 4 may perform the method of FIG. 5 but is not limited to this method. The method of FIG. 5 may be performed by the apparatus of FIG. 4 but is not limited to being performed by this apparatus.

The apparatus comprises means for checking 120, means for storing 130, means for monitoring 140, means for retrieving 150, means for encrypting 160, and means for sending 170. The means for checking 120, means for storing 130, means for monitoring 140, means for retrieving 150, means for encrypting 160, and means for sending 170 may be a checking means, storing means, monitoring means, retrieving means, encrypting means, and sending means, respectively. The means for checking 120, means for storing 130, means for monitoring 140, means for retrieving 150, means for encrypting 160, and means for sending 170 may be a checker, storage device, monitor, retriever, encryption device, and sender, respectively. The means for checking 120, means for storing 130, means for monitoring 140, means for retrieving 150, means for encrypting 160, and means for sending 170 may be a checking processor, storing processor, monitoring processor, retrieving processor, encrypting processor, and sending processor, respectively.

The means for checking 120 checks whether the terminal receives from the first base station a local authentication certificate (S120). For the receiving of the local authentication certificate by the terminal, an established security association between the terminal and a first base station is used. The local authentication certificate comprises a public key of the terminal, a public key of the first base station and a base station identifier of the first base station. If the terminal receives the local authentication certificate (S120=yes), the means for storing 130 stores the local authentication certificate (S130).

Then, the means for monitoring 140 monitors whether the terminal is to be authenticated (S140). For example, the terminal is to be authenticated if it reconnects to the network. S150 to S170 are performed if the terminal is to be authenticated (S140=yes).

The means for retrieving 150 retrieves the public key of the first base station and the base station identifier from the local authentication certificate (S150). The means for encrypting 160 encrypts a certificate unit with the public key of the first base station (S160). The certificate unit comprises the local authentication certificate Thus, the means for encrypting 160 creates an encrypted certificate unit. In some example embodiments, the means for encrypting 160 encrypts the local authentication certificate combined with a nonce to create the encrypted certificate unit.

The means for sending 170 sends a request for local authentication of the terminal to a second base station (S170). The second base station may be the same as the first base station or different therefrom. The request for local authentication comprises the encrypted certificate unit and the base station identifier. The base station identifier is not encrypted in the request for local authentication.

FIG. 6 shows an apparatus according to an example embodiment of the invention. The apparatus may be a base station, such as a gNB or an eNB, or an element thereof. FIG. 7 shows a method according to an example embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises means for generating 220, means for signing 230, means for sending 240, means for monitoring 250, first means for checking 260, means for decrypting 270, second means for checking 280, and means for communicating 290. The means for generating 220, means for signing 230, means for sending 240, means for monitoring 250, first means for checking 260, means for decrypting 270, second means for checking 280, and means for communicating 290 may be a generating means, signing means, sending means, monitoring means, first checking means, decrypting means, second checking means, and communicating means, respectively. The means for generating 220, means for signing 230, means for sending 240, means for monitoring 250, first means for checking 260, means for decrypting 270, second means for checking 280, and means for communicating 290 may be a generator, signatory, sender, monitor, first checker, decryptor, second checker, and communicator, respectively. The means for generating 220, means for signing 230, means for sending 240, means for monitoring 250, first means for checking 260, means for decrypting 270, second means for checking 280, and means for communicating 290 may be a generating processor, signing processor, sending processor, monitoring processor, first checking processor, decrypting processor, second checking processor, and communicating processor, respectively.

The means for generating 220 generates a local authentication certificate (S220). The local authentication certificate comprises an identifier of the base station, a public key of the base station, and a public key of the terminal. The means for signing 230 signs the local authentication certificate by a signature (S230). The signature is based on a private key of the base station. The private key of the base station is belonging to the public key of the base station, i.e., the private key of the base station and the public key of the base station are a pair of keys. The means for sending 240 sends the signed local authentication certificate to the terminal using an established security association between the base station and the terminal (S240).

Then, the means for monitoring 250 monitors whether the base station receives a request for local authentication of the terminal (S250). The request for local authentication comprises an encrypted certificate unit and a base station identifier. The base station identifier is not encrypted.

If the base station receives the request for local authentication (S250=yes), the first means for checking 260 checks whether the received base station identifier is the identifier of the base station (S260). For this checking, the first means for checking 260 does not decrypt the received base station identifier. If the received base station identifier is the identifier of the base station (S260=yes), the means for decrypting 270 decrypts the encrypted certificate unit (S270). For the decrypting, the means for decrypting 270 uses the private key of the base station. Thus, the means for decrypting creates a certificate unit.

The second means for checking 280 checks whether the certificate unit comprises the local authentication certificate signed by the signature of S230 (S280). If the certificate unit comprises the local authentication certificate signed the signature (S280=yes), the means for communicating 290 uses the public key of the terminal for a communication with the terminal (S290). For example, the communication may comprise authenticating the terminal, wherein the terminal is determined as authenticated if the terminal provides a proof of possession of a private key of the terminal belonging to the public key of the terminal.

FIG. 8 shows an apparatus according to an example embodiment of the invention. The apparatus may be a base station, such as a gNB or an eNB, or an element thereof. FIG. 9 shows a method according to an example embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for generating 320, means for signing 330, means for sending 340, means for monitoring 350, means for decrypting 360, means for checking 370, and means for providing 380. The means for generating 320, means for signing 330, means for sending 340, means for monitoring 350, means for decrypting 360, means for checking 370, and means for providing 380 may be a generating means, signing means, sending means, monitoring means, decrypting means, checking means, and providing means, respectively. The means for generating 320, means for signing 330, means for sending 340, means for monitoring 350, means for decrypting 360, means for checking 370, and means for providing 380 may be a generator, signatory, sender, monitor, decryptor, checker, and provider, respectively. The means for generating 320, means for signing 330, means for sending 340, means for monitoring 350, means for decrypting 360, means for checking 370, and means for providing 380 may be a generating processor, signing processor, sending processor, monitoring processor, decrypting processor, checking processor, and providing processor, respectively.

The means for generating 320 generates a local authentication certificate (S320). The local authentication certificate comprises plural information elements including an identifier of the first base station, a public key of the first base station, and the public key of the terminal. The means for signing 330 signs the local authentication certificate by a signature (S330). The signature is based on a private key of the first base station. The private key of the first base station is belonging to the public key of the first base station, i.e., the private key of the first base station and the public key of the first base station are a pair of keys. The means for sending 340 sends the signed local authentication certificate to the terminal using an established security association between the first base station and the terminal (S340).

Then, the means for monitoring 350 monitors whether the first base station receives a request to decrypt an encrypted certificate unit (S350). The request is received from a second base station. If the first base station receives the request to decrypt the encrypted local authentication certificate (S350=yes), the means for decrypting 360 decrypts the encrypted certificate unit (S360). For the decrypting, the means for decrypting 360 uses the private key of the first base station. Thus, the means for decrypting 360 creates a certificate unit.

The means for checking 370 checks whether the certificate unit comprises the local authentication certificate signed by the signature of S330 (S370). If the certificate unit comprises the local authentication certificate signed by the signature (S370=yes), the means for providing 380 provides at least a subset of the information elements comprised by the local authentication certificate unit in response to the received request of S350 (S380). The subset includes at least the public key of the terminal. If the certificate unit does not comprise the local authentication certificate signed by the signature (S370=no), the means for providing 380 may not provide any information elements comprised by the local authentication certificate in response to the received request.

FIG. 10 shows an apparatus according to an example embodiment of the invention. The apparatus may be a base station, such as a gNB or an eNB, or an element thereof. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises first means for monitoring 410, means for checking 420, means for identifying 430, means for requesting 440, second means for monitoring 450, and means for communicating 460. The first means for monitoring 410, means for checking 420, means for identifying 430, means for requesting 440, second means for monitoring 450, and means for communicating 460 may be a first monitoring means, checking means, identifying means, requesting means, second monitoring means, and communicating means, respectively. The first means for monitoring 410, means for checking 420, means for identifying 430, means for requesting 440, second means for monitoring 450, and means for communicating 460 may be a first monitor, checker, identifier, requester, second monitor, and communicator, respectively. The first means for monitoring 410, means for checking 420, means for identifying 430, means for requesting 440, second means for monitoring 450, and means for communicating 460 may be a first monitoring processor, checking processor, identifying processor, requesting processor, second monitoring processor, and communicating processor, respectively.

The first means for monitoring 410 monitors whether a second base station receives a request for local authentication of a terminal (S410). The request for local authentication comprises an encrypted certificate unit and a base station identifier. The base station identifier is not encrypted.

If the second base station receives the request for local authentication (S410=yes), the means for checking 420 checks whether the received base station identifier is an identifier of the second base station (S420). For the checking, the means for checking 420 does not decrypt the received base station identifier.

If the received base station identifier is not the identifier of the second base station (S420=no), the means for identifying 430 identifies a first base station based on the received base station identifier (S430). The means for requesting 440 requests the first base station to decrypt the received encrypted certificate unit and to provide a certificate unit in response to the request to decrypt the received encrypted certificate unit (S440).

The second means for monitoring 450 monitors whether a public key of the terminal is received from the first base station in response to the requesting of S440 (S450). If the public key of the terminal is received from the first base station in response to the requesting of S440 (S450=yes), the means for communicating 460 uses the public key of the terminal for a communication with the terminal (S460). For example, the communication may comprise authenticating the terminal, wherein the terminal is determined as authenticated if the terminal provides a proof of possession of a private key of the terminal belonging to the public key of the terminal.

FIG. 12 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least the method according to at least one of FIG. 5, 7, 9, or 11 and related description.

Technical Clauses

Clause 1. An apparatus comprising means for performing:
checking whether a terminal receives, using an established security association between the terminal and a first base station, from the first base station, a first local authentication certificate, wherein the first local authentication certificate comprises a public key of the terminal, a public key of the first base station, and a base station identifier of the first base station;
storing the first local authentication certificate if the terminal receives the first local authentication certificate;
monitoring whether the terminal is to be authenticated; and
if the terminal is to be authenticated:
retrieving the public key of the first base station and the base station identifier from the first local authentication certificate;
encrypting a certificate unit with the public key of the first base station to create an encrypted certificate unit, wherein the certificate unit comprises the first local authentication certificate; and
sending, to a second base station, a request for local authentication of the terminal, wherein the request for local authentication comprises the encrypted certificate unit and the base station identifier, and the base station identifier is not encrypted in the request for local authentication.

Clause 2. The apparatus according to clause 1, wherein the local authentication certificate further comprises a key identifier; and wherein the means are further configured to perform:
retrieving the key identifier from the first local authentication certificate; and
sending the key identifier in the request for local authentication, wherein the key identifier is not encrypted in the request for local authentication.

Clause 3. The apparatus according to any of clauses 1 and 2, wherein the means are further configured to perform:
selecting a nonce; and at least one of
protecting an uplink message from the terminal to the second base station using the nonce and the communication comprises the uplink message; or
verifying a downlink message received from the second base station to the terminal using the nonce and the communication comprises the downlink message;
wherein
the certificate unit comprises a combination of the first local authentication certificate and the nonce.

Clause 4. The apparatus according to clause 3, wherein the means are further configured to perform:
determining the base station as authenticated if the downlink message from the second base station to the terminal is verified using the nonce.

Clause 5. The apparatus according to clause 4, wherein the means are further configured to perform:
inhibiting the determining the base station as authenticated if the downlink message from the second base station to the terminal is not verified using the nonce.

Clause 6. The apparatus according to any of clauses 1 to 5, wherein the means are further configured to perform:
generating a pair of a private key of the terminal and the public key of the terminal belonging to the private key of the terminal; and
sending the public key of the terminal to the first base station using the established security association prior to the checking whether the terminal receives, using the established security association, the first local authentication certificate.

Clause 7. The apparatus according to any of clauses 1 to 6, wherein the means are further configured to perform:
receiving a pair of a private key of the terminal and the public key of the terminal belonging to the private key of the terminal from the first base station using the established security association prior to the checking whether the terminal receives, using the established security association, the first local authentication certificate.

Clause 8. The apparatus according to any of clauses 1 to 7, wherein the first local authentication certificate comprises an identifier of the terminal, and the means are further configured to perform:
requesting to resume a suspended session with the second base station.

Clause 9. The apparatus according to any of clauses 1 to 8, wherein the first local authentication certificate comprises an identifier of the terminal, and the means are further configured to perform:
monitoring whether a suspended session with the second base station is available for resumption; and
resuming the suspended session if the suspended session is available for resumption.

Clause 10. The apparatus according to any of clauses 1 to 9, wherein the means are further configured to perform:
checking, for each one of plural base stations including the first base station, whether the terminal receives, using a respective established security association between the terminal and the respective base station, from the respective base station, a respective local authentication certificate, wherein the respective local authentication certificate comprises a respective public key of the terminal, a public key of the respective base station, and a base station identifier of the respective base station;
storing, for each one of the plural base stations, the respective local authentication certificate if the terminal receives the respective local authentication certificate; and
selecting one of the stored plural local authentication certificates as the first local authentication certificate.

Clause 11. The apparatus according to clause 10, wherein the means are further configured to perform:
the storing, for each one of the plural base stations, such that the respective local authentication certificate is stored along with a respective applicability indication;
the selecting the one of the stored plural local authentication certificates as the first local authentication certificate based on the respective applicability indication.

Clause 12. The apparatus according to clause 11, wherein the applicability indication is related to at least one of a location of the terminal or system information broadcast by the second base station.

Clause 13. The apparatus according to any of clauses 1 to 12, wherein the encrypting the certificate unit is based on the subscription concealed identifier encryption scheme.

Clause 14. The apparatus according to any of clauses 1 to 13, wherein the first local authentication certificate comprises a policy.

Clause 15. The apparatus according to any of clauses 1 to 14, wherein the terminal comprises the apparatus, or the terminal is the apparatus.

Clause 16. An apparatus comprising means for performing:
generating a local authentication certificate, wherein the local authentication certificate comprises an identifier of a base station, a public key of the base station, and a public key of a terminal;
signing the local authentication certificate by a signature based on a private key of the base station, wherein the private key of the base station is belonging to the public key of the base station;
sending the signed local authentication certificate to the terminal using an established security association between the base station and the terminal;
monitoring whether the base station receives a request for local authentication of the terminal, wherein the request for local authentication comprises an encrypted certificate unit and a base station identifier;
checking, without decrypting the received base station identifier, whether the received base station identifier is the identifier of the base station if the base station receives the request for local authentication;
decrypting the encrypted certificate unit using the private key of the base station to create a certificate unit if the received base station identifier is the identifier of the base station;
checking whether the certificate unit comprises the local authentication certificate signed by the signature; and
using the public key of the terminal for a communication with the terminal if the certificate unit comprises the local authentication certificate signed by the signature.

Clause 17. The apparatus according to clause 16, wherein the local authentication certificate comprises additionally a key identifier;
the key identifier identifies the public key of the base station; and
the received request for local authentication comprises a received key identifier;
wherein the means are further configured to perform:
using the private key of the base station belonging to the public key of the base station identified by the received key identifier to decrypt the encrypted certificate unit.

Clause 18. The apparatus according to any of clauses 16 to 17, wherein the means are further configured to perform:
retrieving a nonce from the certificate unit; and at least one of
protecting a downlink message to the terminal using the nonce, wherein the communication comprises the downlink message; and
verifying an uplink message received from the terminal using the nonce, wherein the communication comprises the uplink message.

Clause 19. The apparatus according to any of clauses 16 to 18, wherein the communication comprises authenticating the terminal, wherein the terminal is determined as authenticated if the terminal provides a proof of possession of a private key of the terminal belonging to the public key of the terminal.

Clause 20. The apparatus according to any of clauses 16 to 19, wherein the local authentication certificate comprises an expiry time; and the means are further configured to perform:
checking whether the expiry time has passed; and
inhibiting the using the public key of the terminal for the communication with the terminal if the expiry time has passed.

Clause 21. The apparatus according to any of clauses 16 to 20, wherein the local authentication certificate comprises an identifier of the terminal, and the means are further configured to perform:
checking whether there is a suspended session with the terminal; and
resuming the suspended session if there is the suspended session with the terminal.

Clause 22. The apparatus according to clause 21, wherein the means are further configured to perform:
checking whether a request to resume the suspended session with the terminal is received; and
inhibiting the resuming the suspended session if the request to resume is not received.

Clause 23. The apparatus according to any of clauses 16 to 22, wherein the means are further configured to perform:
receiving the public key of the terminal using the security association prior to the generating the local authentication certificate.

Clause 24. The apparatus according to any of clauses 16 to 23, wherein the means are further configured to perform:
generating a pair of a private key of the terminal and the public key of the terminal belonging to the private key of the terminal; and
providing the pair of the private key of the terminal and the public key of the terminal to the terminal using the security association.

Clause 25. The apparatus according to any of clauses 16 to 24, wherein the encrypted certificate unit is encrypted based on the subscription concealed identifier encryption scheme.

Clause 26. The apparatus according to any of clauses 16 to 25, wherein the local authentication certificate comprises a policy, and the means are further configured to perform:
authorizing the terminal to a service based on the policy.

Clause 27. The apparatus according to any of clauses 16 to 26, wherein the means are further configured to perform:
    inhibiting the using the public key of the terminal for the communication with the terminal if the certificate unit does not comprise the local authentication certificate signed by the signature.

Clause 28. An apparatus comprising means for performing:
    generating a local authentication certificate, wherein the local authentication certificate comprises plural information elements including an identifier of a first base station, a public key of the first base station, and a public key of a terminal;
    signing the local authentication certificate by a signature based on a private key of the first base station, wherein the private key of the first base station belongs to the public key of the first base station;
    sending the signed local authentication certificate to the terminal using an established security association between the first base station and the terminal;
    monitoring whether the first base station receives, from a second base station, a request to decrypt an encrypted certificate unit;
    decrypting the encrypted certificate unit using the private key of the first base station to create a certificate unit if the first base station receives the request to decrypt the encrypted certificate unit;
    checking whether the certificate unit comprises the local authentication certificate signed by the signature; and
    providing at least a subset of the information elements comprised by the local authentication certificate in response to the received request if the certificate unit comprises the local authentication certificate signed by the signature, wherein the subset includes the public key of the terminal.

Clause 29. The apparatus according to clause 28, wherein the information elements comprised by the local authentication certificate include an expiry time, and the means are further configured to perform:
    checking whether the expiry time has passed; and, if the expiry time has passed, at least one of
    inhibiting the providing the subset of the information elements comprised by the local authentication certificate; or
    providing, in response to the received request, an indication that the expiry time has passed.

Clause 30. The apparatus according to any of clauses 28 and 29, wherein
    the information elements comprised by the local authentication certificate include additionally a key identifier;
    the key identifier identifies the public key of the first base station;
    the received request to decrypt the encrypted certificate unit comprises a received key identifier;
    wherein the means are further configured to perform:
    using the private key belonging to the public key identified by the received key identifier to decrypt the encrypted certificate unit.

Clause 31. The apparatus according to any of clauses 28 to 30, wherein the certificate unit comprises a nonce in addition to the local authentication certificate, and the means are further configured to perform:
    providing the nonce in response to the received request if the certificate unit comprises the nonce.

Clause 32. The apparatus according to any of clauses 28 to 31, wherein the means are further configured to perform:
    inhibiting the providing of at least the subset of the information elements comprised by the local authentication certificate if the certificate unit does not comprise the local authentication certificate signed by the signature.

Clause 33. The apparatus according to any of clauses 28 to 32, wherein the means are further configured to perform:
    receiving the public key of the terminal using the security association prior to the generating the local authentication certificate.

Clause 34. The apparatus according to any of clauses 28 to 33, wherein the means are further configured to perform:
    generating a pair of a private key of the terminal and the public key of the terminal belonging to the private key of the terminal;
    providing the pair of the private key of the terminal and the public key of the terminal to the terminal using the security association.

Clause 35. The apparatus according to any of clauses 28 to 34, wherein the encrypted certificate unit is encrypted based on the subscription concealed identifier encryption scheme.

Clause 36. The apparatus according to any of clauses 28 to 35, wherein an information element comprised by the local authentication certificate is a policy, and the subset of information elements includes the policy.

Clause 37. The apparatus according to any of clauses 16 to 36, wherein the first base station comprises the apparatus, or the first base station is the apparatus.

Clause 38. An apparatus comprising means configured to perform:
    monitoring whether a second base station receives a request for local authentication of a terminal, wherein the request for local authentication comprises an encrypted certificate unit and a base station identifier;
    checking, if the second base station receives the request for local authentication, without decrypting the received base station identifier, whether the received base station identifier is an identifier of the second base station;
    identifying a first base station based on the received base station identifier if the received base station identifier is not the identifier of the second base station;
    requesting the first base station to decrypt the received encrypted certificate unit and to provide a certificate unit in response;
    monitoring whether a public key of the terminal is received from the first base station in response to the requesting; and
    using the public key of the terminal for a communication with the terminal if the public key of the terminal is received.

Clause 39. The apparatus according to clause 38, wherein the means are further configured to perform:
    monitoring whether a nonce is received from the first base station in response to the requesting; and
    protecting a downlink message to the terminal using the nonce if the nonce is received, wherein the communication comprises the downlink message; and
    verifying an uplink message received from the terminal using the nonce if the nonce is received, wherein the communication comprises the uplink message.

Clause 40. The apparatus according to any of clauses 38 and 39, wherein the communication comprises authenticating the terminal, wherein the terminal is determined as authenticated if the terminal provides a proof of possession of a private key of the terminal belonging to the public key of the terminal.

Clause 41. The apparatus according to any of clauses 38 to 40, wherein the means are further configured to perform:
monitoring whether an expiry time is received from the first base station in response to the requesting;
checking whether the expiry time has passed if the expiry time is received; and
inhibiting the using the public key of the terminal for the communication with the terminal if the expiry time has passed.

Clause 42. The apparatus according to any of clauses 38 to 41, wherein the means are further configured to perform:
monitoring whether an identifier of the terminal is received from the first base station in response to the requesting;
checking whether there is a suspended session with the terminal if the identifier is received; and
resuming the suspended session if there is the suspended session with the terminal.

Clause 43. The apparatus according to clause 42, wherein the means are further configured to perform:
checking whether a request to resume the suspended session with the terminal is received; and
inhibiting the resuming the suspended session if the request to resume is not received.

Clause 44. The apparatus according to any of clauses 38 to 43, wherein the means are further configured to perform:
monitoring whether a policy is received from the first base station in response to the requesting;
authorizing the terminal to a service based on the policy if the policy is received.

Clause 45. The apparatus according to any of clauses 38 to 44, wherein the means are further configured to perform:
inhibiting the using the public key of the terminal for the communication with the terminal if an indication that the certificate unit is not valid is received in response to the requesting.

Clause 46. The apparatus according to any of clause 38 to 45, wherein the second base station comprises the apparatus, or the second base station is the apparatus.

Clause 47. The apparatus according to any of clauses 1 to 46, wherein the means comprise at least one processor; and at least one memory including computer program code, the at least one memory and computer program code configured to, with the at least one processor, cause the performance of the apparatus.

Clause 48. A method comprising:
checking whether a terminal receives, using an established security association between the terminal and a first base station, from the first base station, a first local authentication certificate, wherein the first local authentication certificate comprises a public key of the terminal, a public key of the first base station, and a base station identifier of the first base station;
storing the first local authentication certificate if the terminal receives the first local authentication certificate;
monitoring whether the terminal is to be authenticated; and
if the terminal is to be authenticated:
retrieving the public key of the first base station and the base station identifier from the first local authentication certificate;
encrypting a certificate unit with the public key of the first base station to create an encrypted certificate unit, wherein the certificate unit comprises the first local authentication certificate; and
sending, to a second base station, a request for local authentication of the terminal, wherein the request for local authentication comprises the encrypted certificate unit and the base station identifier, and the base station identifier is not encrypted in the request for local authentication.

Clause 49. The method according to clause 48, wherein the local authentication certificate further comprises a key identifier; and wherein the method further comprises:
retrieving the key identifier from the first local authentication certificate; and
sending the key identifier in the request for local authentication, wherein the key identifier is not encrypted in the request for local authentication.

Clause 50. The method according to any of clauses 48 and 49, wherein the method further comprises:
selecting a nonce; and at least one of
protecting an uplink message from the terminal to the second base station using the nonce and the communication comprises the uplink message; or
verifying a downlink message received from the second base station to the terminal using the nonce and the communication comprises the downlink message; wherein
the certificate unit comprises a combination of the first local authentication certificate and the nonce.

Clause 51. The method according to clause 50, wherein the method further comprises:
determining the base station as authenticated if the downlink message from the second base station to the terminal is verified using the nonce.

Clause 52. The method according to clause 51, wherein the method further comprises:
inhibiting the determining the base station as authenticated if the downlink message from the second base station to the terminal is not verified using the nonce.

Clause 53. The method according to any of clauses 48 to 52, wherein the method further comprises:
generating a pair of a private key of the terminal and the public key of the terminal belonging to the private key of the terminal; and
sending the public key of the terminal to the first base station using the established security association prior to the checking whether the terminal receives, using the established security association, the first local authentication certificate.

Clause 54. The method according to any of clauses 48 to 53, wherein the method further comprises:
receiving a pair of a private key of the terminal and the public key of the terminal belonging to the private key of the terminal from the first base station using the established security association prior to the checking whether the terminal receives, using the established security association, the first local authentication certificate.

Clause 55. The method according to any of clauses 48 to 54, wherein the first local authentication certificate comprises an identifier of the terminal, and the method further comprises:
requesting to resume a suspended session with the second base station.

Clause 56. The method according to any of clauses 48 to 55, wherein the first local authentication certificate comprises an identifier of the terminal, and the method further comprises:

monitoring whether a suspended session with the second base station is available for resumption; and resuming the suspended session if the suspended session is available for resumption.

Clause 57. The method according to any of clauses 48 to 56, wherein the method further comprises:

checking, for each one of plural base stations including the first base station, whether the terminal receives, using a respective established security association between the terminal and the respective base station, from the respective base station, a respective local authentication certificate, wherein the respective local authentication certificate comprises a respective public key of the terminal, a public key of the respective base station, and a base station identifier of the respective base station;

storing, for each one of the plural base stations, the respective local authentication certificate if the terminal receives the respective local authentication certificate; and selecting one of the stored plural local authentication certificates as the first local authentication certificate.

Clause 58. The method according to clause 57, wherein the method further comprises:

the storing, for each one of the plural base stations, such that the respective local authentication certificate is stored along with a respective applicability indication;

the selecting the one of the stored plural local authentication certificates as the first local authentication certificate based on the respective applicability indication.

Clause 59. The method according to clause 58, wherein the applicability indication is related to at least one of a location of the terminal or system information broadcast by the second base station.

Clause 60. The method according to any of clauses 48 to 59, wherein the encrypting the certificate unit is based on the subscription concealed identifier encryption scheme.

Clause 61. The method according to any of clauses 48 to 60, wherein the first local authentication certificate comprises a policy.

Clause 62. A method comprising:

generating a local authentication certificate, wherein the local authentication certificate comprises an identifier of a base station, a public key of the base station, and a public key of a terminal;

signing the local authentication certificate by a signature based on a private key of the base station, wherein the private key of the base station is belonging to the public key of the base station;

sending the signed local authentication certificate to the terminal using an established security association between the base station and the terminal;

monitoring whether the base station receives a request for local authentication of the terminal, wherein the request for local authentication comprises an encrypted certificate unit and a base station identifier;

checking, without decrypting the received base station identifier, whether the received base station identifier is the identifier of the base station if the base station receives the request for local authentication;

decrypting the encrypted certificate unit using the private key of the base station to create a certificate unit if the received base station identifier is the identifier of the base station;

checking whether the certificate unit comprises the local authentication certificate signed by the signature; and using the public key of the terminal for a communication with the terminal if the certificate unit comprises the local authentication certificate signed by the signature.

Clause 63. The method according to clause 62, wherein the local authentication certificate comprises additionally a key identifier;

the key identifier identifies the public key of the base station; and the received request for local authentication comprises a received key identifier;

wherein the means are further configured to perform:

using the private key of the base station belonging to the public key of the base station identified by the received key identifier to decrypt the encrypted certificate unit.

Clause 64. The method according to any of clauses 62 to 63, wherein the method further comprises:

retrieving a nonce from the certificate unit; and at least one of protecting a downlink message to the terminal using the nonce, wherein the communication comprises the downlink message; and verifying an uplink message received from the terminal using the nonce, wherein the communication comprises the uplink message.

Clause 65. The method according to any of clauses 62 to 64, wherein the communication comprises authenticating the terminal, wherein the terminal is determined as authenticated if the terminal provides a proof of possession of a private key of the terminal belonging to the public key of the terminal.

Clause 66. The method according to any of clauses 62 to 65, wherein the local authentication certificate comprises an expiry time; and the method further comprises:

checking whether the expiry time has passed; and inhibiting the using the public key of the terminal for the communication with the terminal if the expiry time has passed.

Clause 67. The method according to any of clauses 62 to 66, wherein the local authentication certificate comprises an identifier of the terminal, and the method further comprises:

checking whether there is a suspended session with the terminal; and resuming the suspended session if there is the suspended session with the terminal.

Clause 68. The method according to clause 67, wherein the method further comprises:

checking whether a request to resume the suspended session with the terminal is received; and inhibiting the resuming the suspended session if the request to resume is not received.

Clause 69. The method according to any of clauses 62 to 68, wherein the method further comprises:

receiving the public key of the terminal using the security association prior to the generating the local authentication certificate.

Clause 70. The method according to any of clauses 62 to 69, wherein the method further comprises:

generating a pair of a private key of the terminal and the public key of the terminal belonging to the private key of the terminal; and providing the pair of the private key of the terminal and the public key of the terminal to the terminal using the security association.

Clause 71. The method according to any of clauses 62 to 70, wherein the encrypted certificate unit is encrypted based on the subscription concealed identifier encryption scheme.

Clause 72. The method according to any of clauses 62 to 71, wherein the local authentication certificate comprises a policy, and the method further comprises:

authorizing the terminal to a service based on the policy.

Clause 73. The method according to any of clauses 62 to 72, wherein the method further comprises:

inhibiting the using the public key of the terminal for the communication with the terminal if the certificate unit does not comprise the local authentication certificate signed by the signature.

Clause 74. A method comprising:

generating a local authentication certificate, wherein the local authentication certificate comprises plural information elements including an identifier of a first base station, a public key of the first base station, and a public key of a terminal;

signing the local authentication certificate by a signature based on a private key of the first base station, wherein the private key of the first base station belongs to the public key of the first base station;

sending the signed local authentication certificate to the terminal using an established security association between the first base station and the terminal;

monitoring whether the first base station receives, from a second base station, a request to decrypt an encrypted certificate unit;

decrypting the encrypted certificate unit using the private key of the first base station to create a certificate unit if the first base station receives the request to decrypt the encrypted certificate unit;

checking whether the certificate unit comprises the local authentication certificate signed by the signature; and providing at least a subset of the information elements comprised by the local authentication certificate in response to the received request if the certificate unit comprises the local authentication certificate signed by the signature, wherein the subset includes the public key of the terminal.

Clause 75. The method according to clause 74, wherein information elements comprised by the local authentication certificate include an expiry time, and the method further comprises:

checking whether the expiry time has passed; and, if the expiry time has passed, at least one of inhibiting the providing the subset of the information elements comprised by the local authentication certificate; or providing, in response to the received request, an indication that the expiry time has passed.

Clause 76. The method according to any of clauses 74 and 75, wherein the information elements comprised by the local authentication certificate include additionally a key identifier;

the key identifier identifies the public key of the first base station;

the received request to decrypt the encrypted certificate unit comprises a received key identifier;

wherein the method further comprises:

using the private key belonging to the public key identified by the received key identifier to decrypt the encrypted certificate unit.

Clause 77. The method according to any of clauses 74 to 76, wherein the certificate unit comprises a nonce in addition to the local authentication certificate; and the means are further configured to perform:

providing the nonce in response to the received request if the certificate unit comprises the nonce.

Clause 78. The method according to any of clauses 74 to 77, wherein the method further comprises:

inhibiting the providing of at least the subset of the information elements comprised by the local authentication certificate if the certificate unit does not comprise the local authentication certificate signed by the signature.

Clause 79. The method according to any of clauses 74 to 78, wherein the method further comprises:

receiving the public key of the terminal using the security association prior to the generating the local authentication certificate.

Clause 80. The method according to any of clauses 74 to 79, wherein the method further comprises:

generating a pair of a private key of the terminal and the public key of the terminal belonging to the private key of the terminal;

providing the pair of the private key of the terminal and the public key of the terminal to the terminal using the security association.

Clause 81. The method according to any of clauses 74 to 80, wherein the encrypted certificate unit is encrypted based on the subscription concealed identifier encryption scheme.

Clause 82. The method according to any of clauses 74 to 81, wherein an information element comprised by the local authentication certificate is a policy, and the subset of the information elements comprises the policy.

Clause 83. A method comprising:

monitoring whether a second base station receives a request for local authentication of a terminal, wherein the request for local authentication comprises an encrypted certificate unit and a base station identifier;

checking, if the second base station receives the request for local authentication, without decrypting the received base station identifier, whether the received base station identifier is an identifier of the second base station;

identifying a first base station based on the received base station identifier if the received base station identifier is not the identifier of the second base station;

requesting the first base station to decrypt the received encrypted certificate unit and to provide a certificate unit in response;

monitoring whether a public key of the terminal is received from the first base station in response to the requesting; and using the public key of the terminal for a communication with the terminal if the public key of the terminal is received.

Clause 84. The method according to clause 83, wherein method further comprises:

monitoring whether a nonce is received from the first base station in response to the requesting; and at least one of protecting a downlink message to the terminal using the nonce if the nonce is received, wherein the communication comprises the downlink message; and verifying an uplink message received from the terminal using the nonce if the nonce is received, wherein the communication comprises the uplink message.

Clause 85. The method according to any of clauses 83 and 84, wherein the communication comprises authenticating the terminal, wherein the terminal is determined as authenticated if the terminal provides a proof of possession of a private key of the terminal belonging to the public key of the terminal.

Clause 86. The method according to any of clauses 83 to 85, wherein the method further comprises:
monitoring whether an expiry time is received from the first base station in response to the requesting;
checking whether the expiry time has passed if the expiry time is received; and
inhibiting the using the public key of the terminal for the communication with the terminal if the expiry time has passed.

Clause 87. The method according to any of clauses 83 to 86, wherein the method further comprises:
monitoring whether an identifier of the terminal is received from the first base station in response to the requesting;
checking whether there is a suspended session with the terminal if the identifier is received; and
resuming the suspended session if there is the suspended session with the terminal.

Clause 88. The method according to clause 87, wherein the method further comprises:
checking whether a request to resume the suspended session with the terminal is received; and
inhibiting the resuming the suspended session if the request to resume is not received.

Clause 89. The method according to any of clauses 83 to 88, wherein the method further comprises:
monitoring whether a policy is received from the first base station in response to the requesting;
authorizing the terminal to a service based on the policy if the policy is received.

Clause 90. The method according to any of clauses 83 to 89, wherein the method further comprises:
inhibiting the using the public key of the terminal for the communication with the terminal if an indication that the certificate unit is not valid is received in response to the requesting.

Clause 91. A computer readable medium comprising instructions for causing an apparatus to perform at least the following:
checking whether a terminal receives, using an established security association between the terminal and a first base station, from the first base station, a first local authentication certificate, wherein the first local authentication certificate comprises a public key of the terminal, a public key of the first base station, and a base station identifier of the first base station;
storing the first local authentication certificate if the terminal receives the first local authentication certificate;
monitoring whether the terminal is to be authenticated; and
if the terminal is to be authenticated:
retrieving the public key of the first base station and the base station identifier from the first local authentication certificate;
encrypting a certificate unit with the public key of the first base station to create an encrypted certificate unit, wherein the certificate unit comprises the first local authentication certificate; and
sending, to a second base station, a request for local authentication of the terminal, wherein the request for local authentication comprises the encrypted certificate unit and the base station identifier, and the base station identifier is not encrypted in the request for local authentication.

Clause 92. A computer readable medium comprising instructions for causing an apparatus to perform at least the following:
generating a local authentication certificate, wherein the local authentication certificate comprises an identifier of a base station, a public key of the base station, and a public key of a terminal;
signing the local authentication certificate by a signature based on a private key of the base station, wherein the private key of the base station is belonging to the public key of the base station;
sending the signed local authentication certificate to the terminal using an established security association between the base station and the terminal;
monitoring whether the base station receives a request for local authentication of the terminal, wherein the request for local authentication comprises an encrypted certificate unit and a base station identifier;
checking, without decrypting the received base station identifier, whether the received base station identifier is the identifier of the base station if the base station receives the request for local authentication;
decrypting the encrypted certificate unit using the private key of the base station to create a certificate unit if the received base station identifier is the identifier of the base station;
checking whether the certificate unit comprises the local authentication certificate signed by the signature; and
using the public key of the terminal for a communication with the terminal if the certificate unit comprises the local authentication certificate signed by the signature.

Clause 93. A computer readable medium comprising instructions for causing an apparatus to perform at least the following:
generating a local authentication certificate, wherein the local authentication certificate comprises plural information elements including an identifier of a first base station, a public key of the first base station, and a public key of a terminal;
signing the local authentication certificate by a signature based on a private key of the first base station, wherein the private key of the first base station belongs to the public key of the first base station;
sending the signed local authentication certificate to the terminal using an established security association between the first base station and the terminal;
monitoring whether the first base station receives, from a second base station, a request to decrypt an encrypted certificate unit;
decrypting the encrypted certificate unit using the private key of the first base station to create a certificate unit if the first base station receives the request to decrypt the encrypted certificate unit;
checking whether the certificate unit comprises the local authentication certificate signed by the signature; and
providing at least a subset of the information elements comprised by the local authentication certificate in response to the received request if the certificate unit comprises the local authentication certificate signed by the signature, wherein the subset includes the public key of the terminal.

Clause 94. A computer readable medium comprising instructions for causing an apparatus to perform at least the following:

monitoring whether a second base station receives a request for local authentication of a terminal, wherein the request for local authentication comprises an encrypted certificate unit and a base station identifier;

checking, if the second base station receives the request for local authentication, without decrypting the received base station identifier, whether the received base station identifier is an identifier of the second base station;

identifying a first base station based on the received base station identifier if the received base station identifier is not the identifier of the second base station;

requesting the first base station to decrypt the received encrypted certificate unit and to provide a certificate unit in response;

monitoring whether a public key of the terminal is received from the first base station in response to the requesting; and using the public key of the terminal for a communication with the terminal if the public key of the terminal is received.

Encryption/decryption of the local authentication certificate and the certificate unit is independent from the encryption/decryption that relates to the security association. Typically, the former encryption/decryption is related to a higher layer than the latter encryption/decryption.

Some example embodiments are explained with respect to a 6G network. However, the invention is not limited to 6G. It may be used in other radio networks, too, e.g. in previous or forthcoming generations of 3GPP networks such as 4G, 5G, or 7G, etc. It may be used in non-3GPP mobile communication networks providing authentication.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a terminal (such as a UE or a MTC device) or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a base station (such as a gNB or eNB) or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered as example embodiments of the present invention. However, it should be noted that the description of the example embodiments is given by way of example only and that various modifications may be made without departing from the scope of the invention as defined by the appended claims.

The expression "at least one of A or B" in this document means A, or B, or both A and B.

The invention claimed is:

1. An apparatus comprising
at least one processor; and
at least one memory including computer program code, the at least one memory and computer program code configured to, with the at least one processor, cause the apparatus at least to:
check whether a terminal receives, using an established security association between the terminal and a first base station, from the first base station, a first local authentication certificate, wherein the first local authentication certificate comprises a public key of the terminal, a public key of the first base station, and a base station identifier of the first base station;
store the first local authentication certificate if the terminal receives the first local authentication certificate;
monitor whether the terminal is to be authenticated; and
if the terminal is to be authenticated:
    retrieve the public key of the first base station and the base station identifier from the first local authentication certificate;
    encrypt a certificate unit with the public key of the first base station to create an encrypted certificate unit, wherein the certificate unit comprises the first local authentication certificate; and
    send, to a second base station, a request for local authentication of the terminal, wherein the request for local authentication comprises the encrypted certificate unit and the base station identifier, and the base station identifier is not encrypted in the request for local authentication.

2. The apparatus according to claim 1, wherein the local authentication certificate further comprises a key identifier; and wherein the at least one processor and the at least one memory including the computer program code are further configured to cause the apparatus to:
    retrieve the key identifier from the first local authentication certificate; and
    send the key identifier in the request for local authentication, wherein the key identifier is not encrypted in the request for local authentication.

3. The apparatus according to claim 2, wherein the at least one processor and the at least one memory including the computer program code are further configured to cause the apparatus to:
select a nonce; and at least one of
protect an uplink message from the terminal to the second base station using the nonce and the communication comprises the uplink message; or
verify a downlink message received from the second base station to the terminal using the nonce and the communication comprises the downlink message; wherein
the certificate unit comprises a combination of the first local authentication certificate and the nonce.

4. The apparatus according to claim 1, wherein the at least one processor and the at least one memory including the computer program code are further configured to cause the apparatus to:
select a nonce; and at least one of
protect an uplink message from the terminal to the second base station using the nonce and the communication comprises the uplink message; or
verify a downlink message received from the second base station to the terminal using the nonce and the communication comprises the downlink message; wherein
the certificate unit comprises a combination of the first local authentication certificate and the nonce.

5. The apparatus according to claim 4, wherein the at least one processor and the at least one memory including the computer program code are further configured to cause the apparatus to:
determine the base station as authenticated if the downlink message from the second base station to the terminal is verified using the nonce.

6. The apparatus according to claim 1, wherein the at least one processor and the at least one memory including the computer program code are further configured to cause the apparatus to:
generate a pair of a private key of the terminal and the public key of the terminal belonging to the private key of the terminal; and
send the public key of the terminal to the first base station using the established security association prior to the checking whether the terminal receives, using the established security association, the first local authentication certificate.

7. The apparatus according to claim 1, wherein the at least one processor and the at least one memory including the computer program code are further configured to cause the apparatus to:
check, for each one of plural base stations including the first base station, whether the terminal receives, using a respective established security association between the terminal and the respective base station, from the respective base station, a respective local authentication certificate, wherein the respective local authentication certificate comprises a respective public key of the terminal, a public key of the respective base station, and a base station identifier of the respective base station;
store, for each one of the plural base stations, the respective local authentication certificate if the terminal receives the respective local authentication certificate; and
select one of the stored plural local authentication certificates as the first local authentication certificate.

8. An apparatus comprising at least one processor; and
at least one memory including computer program code, the at least one memory and computer program code configured to, with the at least one processor, cause the apparatus at least to:
generate a local authentication certificate, wherein the local authentication certificate comprises an identifier of a base station, a public key of the base station, and a public key of a terminal;
sign the local authentication certificate by a signature based on a private key of the base station, wherein the private key of the base station is belonging to the public key of the base station;
send the signed local authentication certificate to the terminal using an established security association between the base station and the terminal;
monitor whether the base station receives a request for local authentication of the terminal, wherein the request for local authentication comprises an encrypted certificate unit and a base station identifier;
check, without decrypting the received base station identifier, whether the received base station identifier is the identifier of the base station if the base station receives the request for local authentication;
decrypt the encrypted certificate unit using the private key of the base station to create a certificate unit if the received base station identifier is the identifier of the base station;
check whether the certificate unit comprises the local authentication certificate signed by the signature; and
use the public key of the terminal for a communication with the terminal if the certificate unit comprises the local authentication certificate signed by the signature.

9. The apparatus according to claim 8, wherein
the local authentication certificate comprises additionally a key identifier;
the key identifier identifies the public key of the base station; and
the received request for local authentication comprises a received key identifier;
wherein the at least one processor and the at least one memory including the computer program code are further configured to cause the apparatus to:
use the private key of the base station belonging to the public key of the base station identified by the received key identifier to decrypt the encrypted certificate unit.

10. The apparatus according to claim 9, wherein the at least one processor and the at least one memory including the computer program code are further configured to cause the apparatus to:
retrieve a nonce from the certificate unit; and at least one of
protect a downlink message to the terminal using the nonce, wherein the communication comprises the downlink message; and
verify an uplink message received from the terminal using the nonce, wherein the communication comprises the uplink message.

11. The apparatus according to claim 10, wherein the at least one processor and the at least one memory including the computer program code are further configured to cause the apparatus to:
receive the public key of the terminal using the security association prior to the generating the local authentication certificate.

12. The apparatus according to claim 11, wherein the local authentication certificate comprises a policy, and the at least one processor and the at least one memory including the computer program code are further configured to cause the apparatus to:

authorize the terminal to a service based on the policy.

13. The apparatus according to claim 8, wherein the at least one processor and the at least one memory including the computer program code are further configured to cause the apparatus to:

retrieve a nonce from the certificate unit; and at least one of protect a downlink message to the terminal using the nonce, wherein the communication comprises the downlink message; and verify an uplink message received from the terminal using the nonce, wherein the communication comprises the uplink message.

14. The apparatus according to claim 8, wherein the at least one processor and the at least one memory including the computer program code are further configured to cause the apparatus to:

receive the public key of the terminal using the security association prior to the generating the local authentication certificate.

15. The apparatus according to claim 8, wherein the local authentication certificate comprises a policy, and the at least one processor and the at least one memory including the computer program code are further configured to cause the apparatus to:

authorize the terminal to a service based on the policy.

16. An apparatus comprising at least one processor; and at least one memory including computer program code, the at least one memory and computer program code configured to, with the at least one processor, cause the apparatus at least to:

generate a local authentication certificate, wherein the local authentication certificate comprises plural information elements including an identifier of a first base station, a public key of the first base station, and a public key of a terminal;

sign the local authentication certificate by a signature based on a private key of the first base station, wherein the private key of the first base station belongs to the public key of the first base station;

send the signed local authentication certificate to the terminal using an established security association between the first base station and the terminal;

monitor whether the first base station receives, from a second base station, a request to decrypt an encrypted certificate unit;

decrypt the encrypted certificate unit using the private key of the first base station to create a certificate unit if the first base station receives the request to decrypt the encrypted certificate unit;

check whether the certificate unit comprises the local authentication certificate signed by the signature; and provide at least a subset of the information elements comprised by the local authentication certificate in response to the received request if the certificate unit comprises the local authentication certificate signed by the signature, wherein the subset includes the public key of the terminal.

17. The apparatus according to claim 16, wherein the information elements comprised by the local authentication certificate include additionally a key identifier;

the key identifier identifies the public key of the first base station;

the received request to decrypt the encrypted certificate unit comprises a received key identifier;

wherein the at least one processor and the at least one memory including the computer program code are further configured to cause the apparatus to:

use the private key belonging to the public key identified by the received key identifier to decrypt the encrypted certificate unit.

18. The apparatus according to claim 17, wherein the certificate unit comprises a nonce in addition to the local authentication certificate, and the at least one processor and the at least one memory including the computer program code are further configured to cause the apparatus to:

provide the nonce in response to the received request if the certificate unit comprises the nonce.

19. The apparatus according to claim 16, wherein the certificate unit comprises a nonce in addition to the local authentication certificate, and the at least one processor and the at least one memory including the computer program code are further configured to cause the apparatus to:

provide the nonce in response to the received request if the certificate unit comprises the nonce.

\* \* \* \* \*